(12) United States Patent
D'Agostini et al.

(10) Patent No.: US 9,243,799 B2
(45) Date of Patent: Jan. 26, 2016

(54) COMBUSTION SYSTEM WITH PRECOMBUSTOR FOR RECYCLED FLUE GAS

(75) Inventors: Mark Daniel D'Agostini, Ebensburg, PA (US); Reed Jacob Hendershot, Breinigsville, PA (US); Aleksandar Georgi Slavejkov, Allentown, PA (US); Xiaoyi He, Orefield, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 1557 days.

(21) Appl. No.: 12/566,819

(22) Filed: Sep. 25, 2009

(65) Prior Publication Data
US 2010/0081098 A1 Apr. 1, 2010

Related U.S. Application Data

(60) Provisional application No. 61/100,372, filed on Sep. 26, 2008.

(51) Int. Cl.
*F23C 9/00* (2006.01)
*F23L 7/00* (2006.01)
*F23C 6/04* (2006.01)
(Continued)

(52) U.S. Cl.
CPC . *F23L 7/007* (2013.01); *F23C 6/04* (2013.01); *F23C 9/00* (2013.01); *F23M 5/025* (2013.01); *F23C 2202/10* (2013.01);
(Continued)

(58) Field of Classification Search
CPC .......... F23C 6/04; F23C 9/00; F23C 2202/50; F23C 2202/10; F23C 2900/06041; F23C 2900/07006; F23L 7/007; F23M 5/025; Y02E 20/344

USPC ............. 431/5, 353, 115, 116, 160, 187, 210, 431/211, 212, 215, 216, 217, 11, 36, 37; 110/204, 205
IPC ............................... F23C 9/00; F23L 7/00,9/04
See application file for complete search history.

(56) References Cited

U.S. PATENT DOCUMENTS 2,484,272 A * 10/1949 Crowe .................. F23D 17/002
 122/6.5
2,865,344 A 12/1958 Firl
(Continued)

FOREIGN PATENT DOCUMENTS

EP 1 435 484 A2 7/2004
EP 1 517 085 A2 3/2005
(Continued)

OTHER PUBLICATIONS

Mark Daniel D'Agostini, Oxygen Control System for Oxygen Enhanced Combustion of Solid Fuels, U.S. Appl. No. 12/138,755, filed Jun. 13, 2008.
(Continued)

*Primary Examiner* — Gregory Huson
*Assistant Examiner* — Daniel E Namay
(74) *Attorney, Agent, or Firm* — Michael K. Boyer; Amy Carr-Trexler

(57) ABSTRACT

A precombustor system to be used in conjunction with an oxy-fuel burner employing recycled flue gas is disclosed. A method of introducing streams into the precombustor to achieve desired improvements in flame properties is also disclosed.

18 Claims, 27 Drawing Sheets

(51) Int. Cl.
*F23M 5/02* (2006.01)
*F23L 9/04* (2006.01)

(52) U.S. Cl.
CPC .. *F23C 2202/50* (2013.01); *F23C 2900/06041* (2013.01); *F23L 2900/07006* (2013.01); *Y02E 20/344* (2013.01)

(56) References Cited

U.S. PATENT DOCUMENTS

| | | | | |
|---|---|---|---|---|
| 3,202,201 A * | 8/1965 | Masella | | C21C 5/4606 239/132.3 |
| 3,512,219 A * | 5/1970 | Gundzik | | B01J 19/26 110/104 R |
| 3,982,878 A * | 9/1976 | Yamane | | F02B 43/10 123/1 A |
| 4,023,921 A * | 5/1977 | Anson | | 431/9 |
| 4,666,463 A * | 5/1987 | Stellaccio | | C10J 3/506 122/6.6 |
| 4,865,542 A * | 9/1989 | Hasenack | | C10J 3/506 110/263 |
| 5,145,359 A * | 9/1992 | Ancona | | F23C 7/004 239/402.5 |
| 5,149,261 A * | 9/1992 | Suwa et al. | | 431/207 |
| 5,199,866 A * | 4/1993 | Joshi et al. | | 431/353 |
| 5,256,058 A * | 10/1993 | Slavejkov et al. | | 431/187 |
| 5,261,602 A * | 11/1993 | Brent | | C01B 3/363 110/347 |
| 5,411,394 A * | 5/1995 | Beer et al. | | 431/9 |
| 5,611,683 A * | 3/1997 | Baukal et al. | | 431/10 |
| 5,730,070 A | 3/1998 | Kunkel et al. | | |
| 5,944,507 A * | 8/1999 | Feldermann | | F23C 7/002 239/399 |
| 6,083,466 A * | 7/2000 | Djavdan | | C01B 17/046 423/210 |
| 6,139,310 A * | 10/2000 | Mahoney | | F23D 14/22 239/423 |
| 6,298,654 B1 | 10/2001 | Vermes et al. | | |
| 6,314,896 B1 * | 11/2001 | Marin et al. | | 110/345 |
| 6,383,462 B1 * | 5/2002 | Lang | | F23C 9/08 110/345 |
| 6,450,799 B1 * | 9/2002 | Mahoney | | C21C 5/5217 266/222 |
| 6,524,096 B2 * | 2/2003 | Pribish | | 431/8 |
| 6,532,881 B2 * | 3/2003 | Marin et al. | | 110/345 |
| 6,565,361 B2 * | 5/2003 | Jones | | F23C 6/047 438/6 |
| 6,685,462 B2 * | 2/2004 | Jones et al. | | 431/8 |
| 6,783,357 B2 * | 8/2004 | Joshi | | F23C 7/002 239/397.5 |
| 6,846,175 B2 * | 1/2005 | Spicer | | 431/9 |
| 6,881,053 B2 * | 4/2005 | Stephens et al. | | 431/9 |
| 6,938,560 B2 * | 9/2005 | Okazaki et al. | | 110/204 |
| 7,074,034 B2 * | 7/2006 | Hoke et al. | | 431/10 |
| 7,229,483 B2 * | 6/2007 | Lewis | | C10J 3/00 431/10 |
| 7,303,388 B2 * | 12/2007 | Joshi et al. | | 431/10 |
| 7,484,956 B2 * | 2/2009 | Kobayashi et al. | | 431/10 |
| 7,717,701 B2 * | 5/2010 | D'Agostini et al. | | 431/9 |
| 8,246,343 B2 * | 8/2012 | Ghani et al. | | 431/9 |
| 8,393,065 B2 * | 3/2013 | Tatsumi et al. | | 29/401.1 |
| 8,454,354 B2 * | 6/2013 | Watson et al. | | 431/187 |
| 8,647,111 B2 * | 2/2014 | Mennie et al. | | 431/2 |
| 8,662,883 B2 * | 3/2014 | Mennie et al. | | 431/5 |
| 2002/0185043 A1 | 12/2002 | Marin et al. | | |
| 2003/0013059 A1 * | 1/2003 | Dutescu et al. | | 431/202 |
| 2004/0009446 A1 * | 1/2004 | Tsiava | | C01B 17/0417 431/187 |
| 2005/0058958 A1 * | 3/2005 | Kobayashi et al. | | 431/10 |
| 2006/0029896 A1 * | 2/2006 | Poe et al. | | 431/285 |
| 2006/0057516 A1 * | 3/2006 | Miller | | F23C 3/002 431/8 |
| 2006/0234172 A1 * | 10/2006 | Melton et al. | | 431/5 |
| 2007/0037107 A1 * | 2/2007 | von Schweinitz et al. | | 431/12 |
| 2009/0035709 A1 * | 2/2009 | Mennie et al. | | 431/5 |
| 2009/0064909 A1 * | 3/2009 | Mennie et al. | | 110/212 |
| 2009/0308331 A1 * | 12/2009 | D'Agostini et al. | | 122/13.01 |
| 2010/0077944 A1 * | 4/2010 | Slavejkov et al. | | 110/345 |
| 2010/0236500 A1 * | 9/2010 | Douglas et al. | | 122/22 |
| 2011/0073022 A1 * | 3/2011 | Maryamchik et al. | | 110/297 |
| 2011/0217661 A1 * | 9/2011 | Van Der Ploeg | | C10J 3/506 431/160 |
| 2013/0125798 A1 * | 5/2013 | Taylor | | 110/205 |

FOREIGN PATENT DOCUMENTS

| | | |
|---|---|---|
| WO | 01/18371 A1 | 3/2001 |
| WO | 2007117243 A1 | 10/2007 |
| WO | 2008/141412 A1 | 11/2008 |
| WO | 2008/142654 A2 | 11/2008 |

OTHER PUBLICATIONS

Mark Daniel D'Agostini, Oxy/Fuel Combustion System With Minimized Flue Gas Recirculation, U.S. Appl. No. 12/238,657, filed Sep. 26, 2008.

D'Agostini et al; U.S. Appl. No. 12/238,612, filed Sep. 26, 2008; Title: Oxy/Fuel Combustion System with Little or no Excess Oxygen.

Fogash et al; U.S. Appl. No. 12/238,632, filed Sep. 26, 2008; Title: Combustion System with Steam or Water Injection.

D'Agostini et al; U.S. Appl. No. 12/238,731, filed Sep. 26, 2008; Title: Process Temperature Control in Oxy/Fuel Combustion System.

Hendershot et al; U.S. Appl. No. 12/238,695, filed Sep. 26, 2008; Title: Oxy/Fuel Combustion System having Combined Convective Section and Radiant Section.

Hendershot, et al; U.S. Appl. No. 12/238,671, filed Sep. 26, 2008; Title: Convective Section Combustion.

Slavejkov, et al; U.S. Appl. No. 12/238,644, filed Sep. 26, 2008; Title: Combustion System with Precombuster.

Kloosterman, et al; U.S. Appl. No. 12/238,713, filed Sep. 26, 2008; Title: Transient Operation of Oxy/Fuel Combustion System.

* cited by examiner

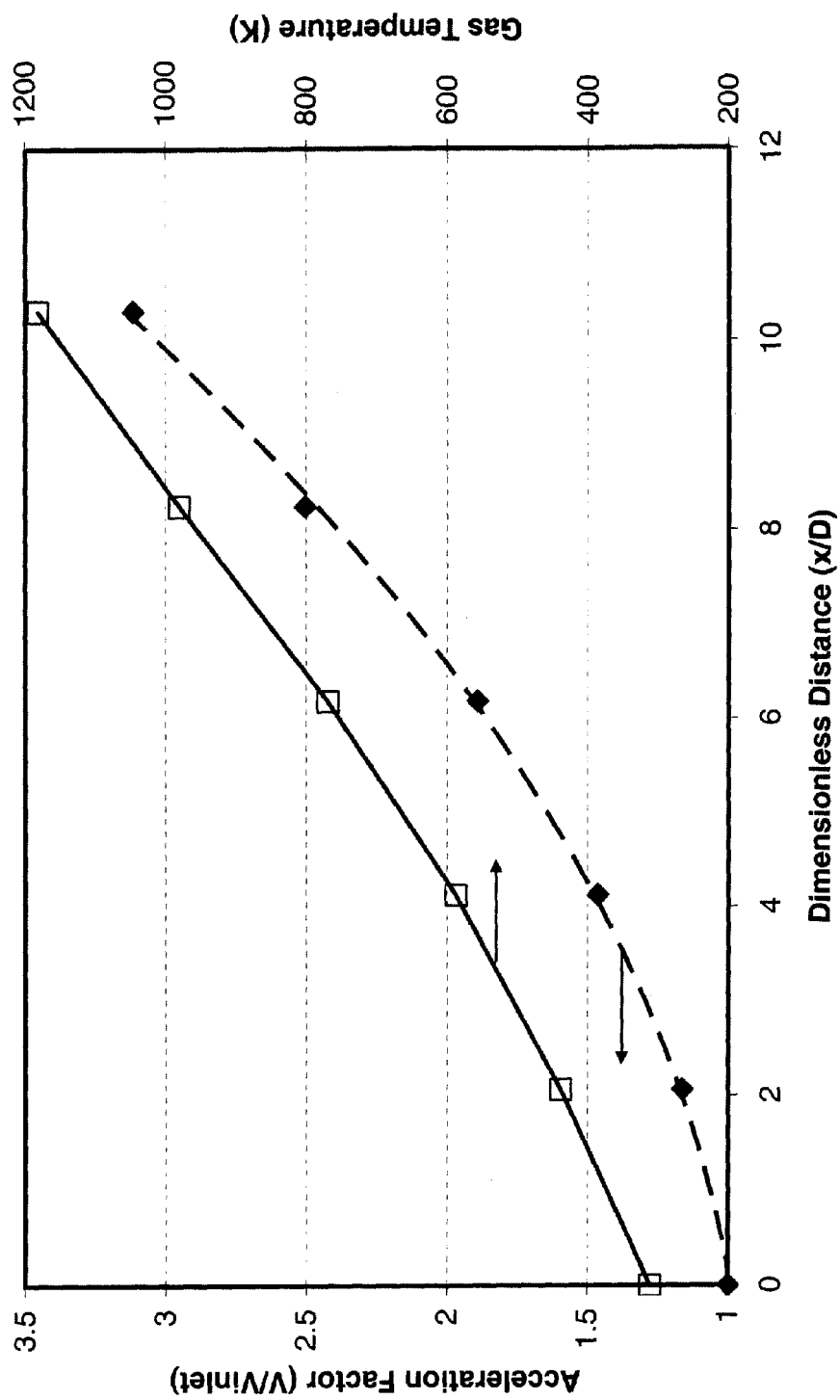

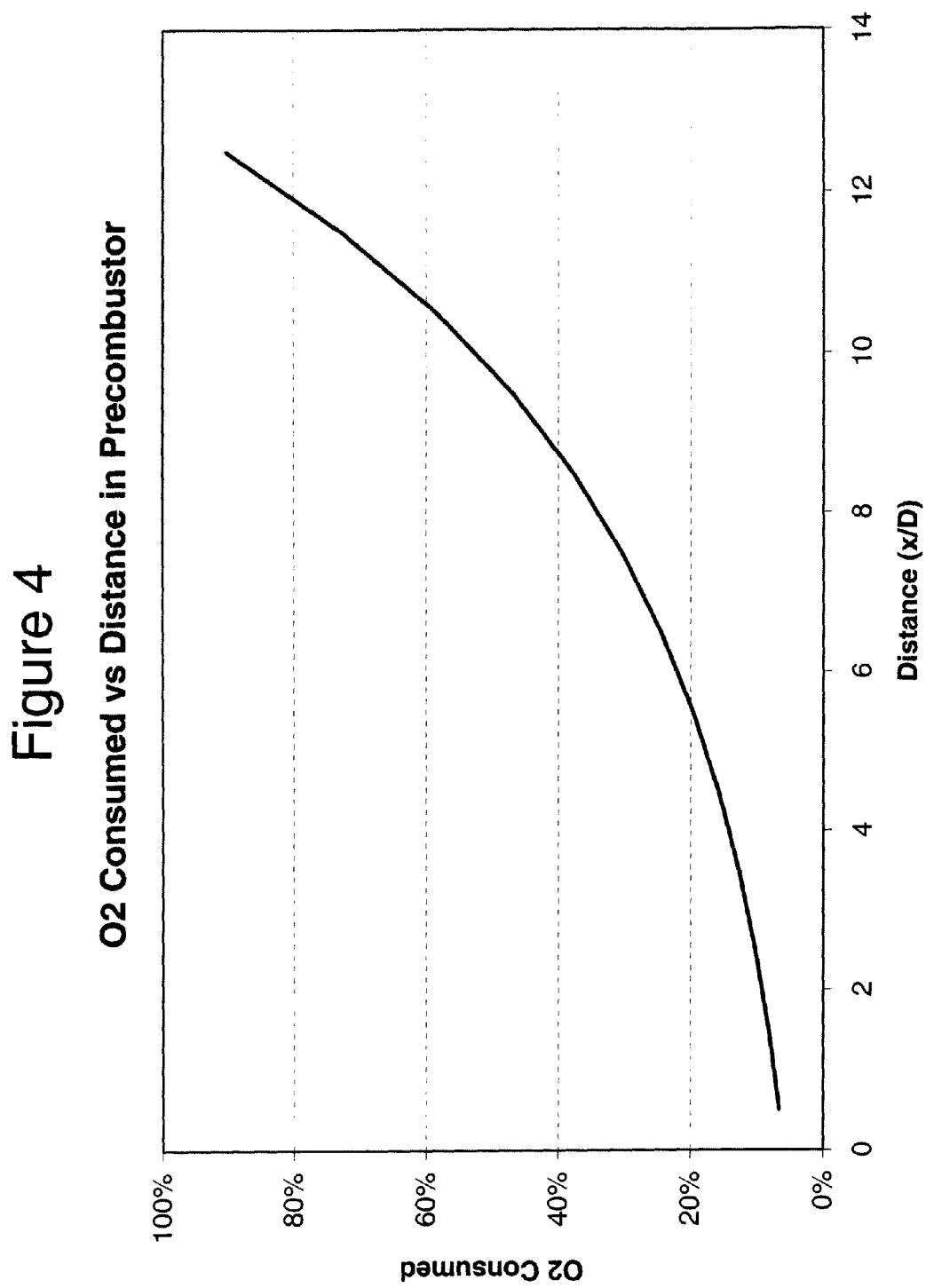

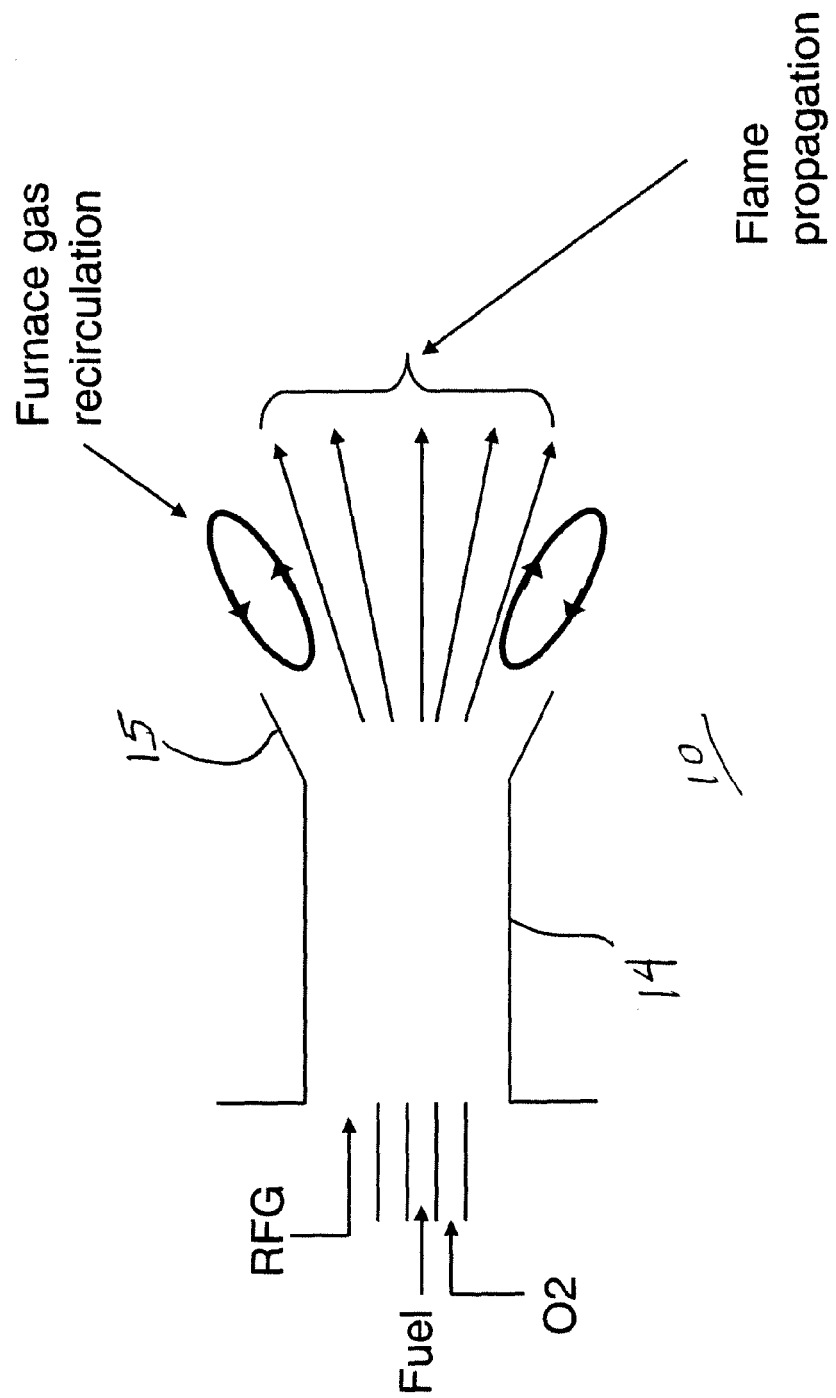

COMBUSTION SYSTEM WITH PRECOMBUSTOR FOR RECYCLED FLUE GAS

CROSS-REFERENCE TO RELATED APPLICATIONS

This Application claims the benefit of Provisional Application No. 61/100,372, filed on Sep. 26, 2008. The disclosure of this Provisional Application is hereby incorporated by reference.

This Application is related to application Ser. No. 12/238,612, entitled "OXY/FUEL COMBUSTION SYSTEM WITH LITTLE OR NO EXCESS OXYGEN", filed contemporaneously with this Application on Sep. 26, 2008, assigned to the assignee of the present disclosure and which is herein incorporated by reference in its entirety, application Ser. No. 12/238,632, entitled "COMBUSTION SYSTEM WITH STEAM OR WATER INJECTION", filed contemporaneously with this Application on Sep. 26, 2008, assigned to the assignee of the present disclosure and which is herein incorporated by reference in its entirety, application Ser. No. 12/238,644, entitled "COMBUSTION SYSTEM WITH PRECOMBUSTOR", filed contemporaneously with this Application on Sep. 26, 2008, assigned to the assignee of the present disclosure and which is herein incorporated by reference in its entirety, application Ser. No. 12/238,657, entitled "OXY/FUEL COMBUSTION SYSTEM WITH MINIMIZED FLUE GAS RECIRCULATION", filed contemporaneously with this Application on Sep. 26, 2008, assigned to the assignee of the present disclosure and which is herein incorporated by reference in its entirety, application Ser. No. 12/238,671, entitled "CONVECTIVE SECTION COMBUSTION", filed contemporaneously with this Application on Sep. 26, 2008, assigned to the assignee of the present disclosure and which is herein incorporated by reference in its entirety, application Ser. No. 12/238,695, entitled "OXY/FUEL COMBUSTION SYSTEM HAVING COMBINED CONVECTIVE SECTION AND RADIANT SECTION", filed contemporaneously with this Application on Sep. 26, 2008, assigned to the assignee of the present disclosure and which is herein incorporated by reference in its entirety, and application Ser. No. 12/238,731, entitled "PROCESS TEMPERATURE CONTROL IN OXY/FUEL COMBUSTION SYSTEM", filed contemporaneously with this Application on Sep. 26, 2008, assigned to the assignee of the present disclosure and which is herein incorporated by reference in its entirety and application Ser. No. 12/238,713, entitled "TRANSIENT OPERATION OF OXY/FUEL COMBUSTION SYSTEM", filed contemporaneously with this Application on Sep. 26, 2008, assigned to the assignee of the present disclosure and which is herein incorporated by reference in its entirety.

BACKGROUND OF THE INVENTION

The present disclosure is directed to a combustion system. In particular, the present disclosure is directed to an oxy/fuel combustion system.

The conversion of boilers and process heaters from air/fuel to oxy/fuel operation for $CO_2$ capture and/or purification represents a major modification to a mature technology. Much of the technical discussion surrounding effects introduced into the performance of these boilers and heaters has focused on the distribution of heat transfer between, for example, radiant and convective exchange, and its effect on process efficiency and component life.

Many large boilers and heaters operate with dozens of burners. These burners impart mixing and momentum to reactants that largely define factors such as flame length, shape, luminosity and efficiency of carbon burn out. These performance factors are finely tuned by process engineers and operators over years of operation to facilitate process conditions enabling component life and process efficiency to be increased. It is known, however that, due largely to differences in emissivity and heat capacity between nitrogen and carbon dioxide, the reactant flow rates for oxy/fuel operation using synthetic air ($CO_2/O_2$) may be lower than for equivalent air/fuel firing rates. Since the number of burner designs used in current commercial practice is very large, it is not practical to attempt an optimization of each burner design. It is more practical to provide a device that can be fitted onto existing or future burners to provide adjustability to the flame characteristics as they are encountered during boiler and process heater operation. It is accordingly the object of this disclosure to describe a device and method of operation of oxy-fuel burners used in boilers and process heaters that allows for this adjustability to occur.

At fixed fuel firing rate, recycling of flue gas may permit process operators to optimize heat exchange within the system. Generally, the proportion of flue gas recycle to oxygen flow rate results in a mixed concentration of $O_2$ in $CO_2$ of between 25 and 30 mol % for air/fuel firing. The level is different when considering matching of flame temperature than it is for matching of heat exchange characteristics, and it is also fuel dependent. Moreover, the relative importance of burner flame momentum in this optimization is essentially unknown.

U.S. Pat. No. 5,256,058 discloses an oxy-fuel burner that employs a precombustor between a burner and a process furnace. U.S. Pat. No. 5,199,866 discloses an adjustable oxy-fuel burner. The disclosure of these U.S. Patents is hereby incorporated by reference.

There is a need in this art for an oxy-fuel combustion system and method for its usage that can employ recycled flue-gas (RFG) in a burner that can produce a flame having desirable properties.

BRIEF SUMMARY OF THE INVENTION

The instant invention solves problems associated with convention practices by providing a burner with a precombustor that utilizes recycled flue gas, fuel and oxygen to adjust properties of an oxy/fuel flame. Desirable aspects of the inventive combustion system include:
- Various configurations of introducing the RFG and $O_2$ into the precombustor
- Using RFG of at least a certain minimum temperature to facilitate flame ignition
- Flame stability including a flame emanating from the end face of the precombustor
- Using RFG to control temperature of the combustion system.
- Geometric parameters
  - Variation of precombustor cross-sectional area with distance
- Integrated design
  - Use of staged RFG (either internal/external or staged internally) to maintain consistent flame momentum over the entire range of firing rate of the burner
  - Use of staged $O_2$ (either internal/external or staged internally) to vary the maximum flame temperature and heat release rate One aspect of the invention, relates to using RFG to control or modify certain flame characteristics. For example, RFG can be employed as a thermal shield (e.g., RFG is more effective as a thermal shield than the use of air or $O_2$ on an equivalent volumetric basis). This is due to the fact that RFG comprises primarily $CO_2$ and water vapor, and hence is relatively non-reactive in the presence of fuel, and also due to the higher heat capacity and radiative absorptivity of RFG relative to both $O_2$ and $N_2$. While any suitable RFG source can be employed in the instant invention, on a dry particle free basis the RFG typically comprises about 50 to about 90 percent by volume CO2 with the remainder which can be comprised of at least one of oxygen, nitrogen, argon, carbon monoxide, nitrogen oxides, sulfur oxides, and other minor components. The water fraction of the RFG is typically less than or equal to the water vapor saturation amount at the inlet temperature to the burner. The particle loading of the RFG depends on the fuel type and possible filtering of the RFG before injection into the burner.

The disclosure herein includes a precombustor system to be used in conjunction with an oxy-fuel burner employing recycled flue gas. The disclosure also includes a method of introducing streams into the precombustor to achieve desired improvements in flame properties.

One aspect of the invention relates to a combustion system comprising: a precombustor comprising a passage extending through the precombustor, said passage adapted to receive reaction products from a burner having a longitudinal axis wherein the longitudinal axis is coincident with the passage, and wherein the burner comprises at least two annular fluid apertures surrounding a central aperture so that fluid exiting the at least two surrounding fluid apertures surrounds fluid exiting the central aperture and wherein the fluid exiting the apertures comprises at least one member selected from the group consisting of oxygen, fuel, RFG and mixtures, thereof.

Another aspect of the invention relates to an oxy/fuel combustion system comprising an oxy-fuel burner having a fuel conduit and an oxygen conduit surrounding the fuel conduit and a recycled flue gas conduit that surrounds at least one of the fuel conduit and the oxygen conduit, and a precombustor dimensioned and positioned to receive streams from the burner.

A further aspect of the invention relates to a method for combusting a fuel comprising: providing a combustion system comprising a precombustor comprising a passage extending through the precombustor, said passage adapted to receive streams from an oxy/fuel burner having a longitudinal axis wherein the longitudinal axis is coincident with the passage, and wherein the burner comprises at least two concentric fluid apertures surrounding a central aperture for fuel so that fluid exiting the at least two surrounding fluid apertures surrounds fuel exiting the central aperture and wherein one of said at least two surrounding apertures contains oxygen and one contains RFG. passing oxygen, fuel and recycled flue gas through their respective conduits in the oxy/fuel burner, and; passing the streams through the precombustor; wherein the flow rate of at least one of oxygen and recycled flue gas is varied in response to an external measurement.

Further aspects of the method and system are disclosed herein. The features as discussed above, as well as other features and advantages of the present invention will be appreciated and understood by those skilled in the art from the following detailed description and drawings.

BRIEF DESCRIPTION OF SEVERAL VIEWS OF THE DRAWINGS

FIG. 1-18 illustrate various aspects of the present disclosure.

FIGS. 1 and 2 illustrate one aspect of the inventive combustion system.

FIGS. 3 and 4 illustrate desirable results that can be achieved by using a precombustor.

FIG. 5 illustrates differing precombustors that can be employed in the instant invention.

FIGS. 6 through 8 illustrate certain aspects of the invention relating to varying the position of the streams supplied to a burner.

FIGS. 10 and 11 illustrate one desirable result that can be achieved by controlling the RFG that is supplied to the inventive combustion system.

FIGS. 12 and 13 illustrate some desirable results that can be achieved by controlling oxygen that is supplied to the inventive combustion system.

FIGS. 9 and 14 through 20 illustrate certain aspects of the invention relating to staging various streams supplied to the burner.

DETAILED DESCRIPTION OF THE INVENTION

As used herein, the term "fuel" refers to any fuel suitable for combustion purposes. For example, the disclosure may be used with many types of fuels, including but not limited to: natural gas, hydrogen, refinery off gas, refinery fuel gas, blast furnace gas, propane, fuel oils, anthracite, bituminous, sub-bituminous, and lignite coals; tar; bitumen; petroleum coke; paper mill sludge solids and sewage sludge solids; wood; peat; grass; and combinations and mixtures of all of those fuels. As used herein, the term "oxygen" refers to an oxidizer with an $O_2$ concentration greater than about 30 mol %; typically greater than about 80 mol % and includes oxygen enriched air and oxygen mixed with recycled flue gas. As used herein, the term oxy/coal combustion refers to coal combustion in oxygen, the term air/coal combustion refers to coal combustion in air, the term oxy/fuel combustion refers to fuel combustion in oxygen, and the term air/fuel combustion refers to fuel combustion in air. As used herein, the term "combustion fluid" refers to a fluid formed from and/or mixed with the products of combustion, which may be utilized for convective heat transfer. The term is not limited to the products of combustion and may include fluids mixed with or otherwise traveling through at least a portion of combustion system. As used herein, the term "recycled flue gas" or "RFG" refers to fluid exiting at any suitable location along (including the end) the convective section that is recirculated to any portion of the system. If desired, oxygen can be added to the RFG at any suitable location (e.g., the RFG can comprise up to 30 mole percent O2 prior to being introduced into the burner and/or precombustor). As used here, the term "flue gas recycle" or "FGR" refers to a configuration permitting the combustion fluid to be recycled into recycled flue gas. While any suitable flue gas source can be employed (including, without limitation, flue gas from an adjoining or a distinct process), typically the flue gas comprises products of combustion from usage of the inventive system.

Figure 1:
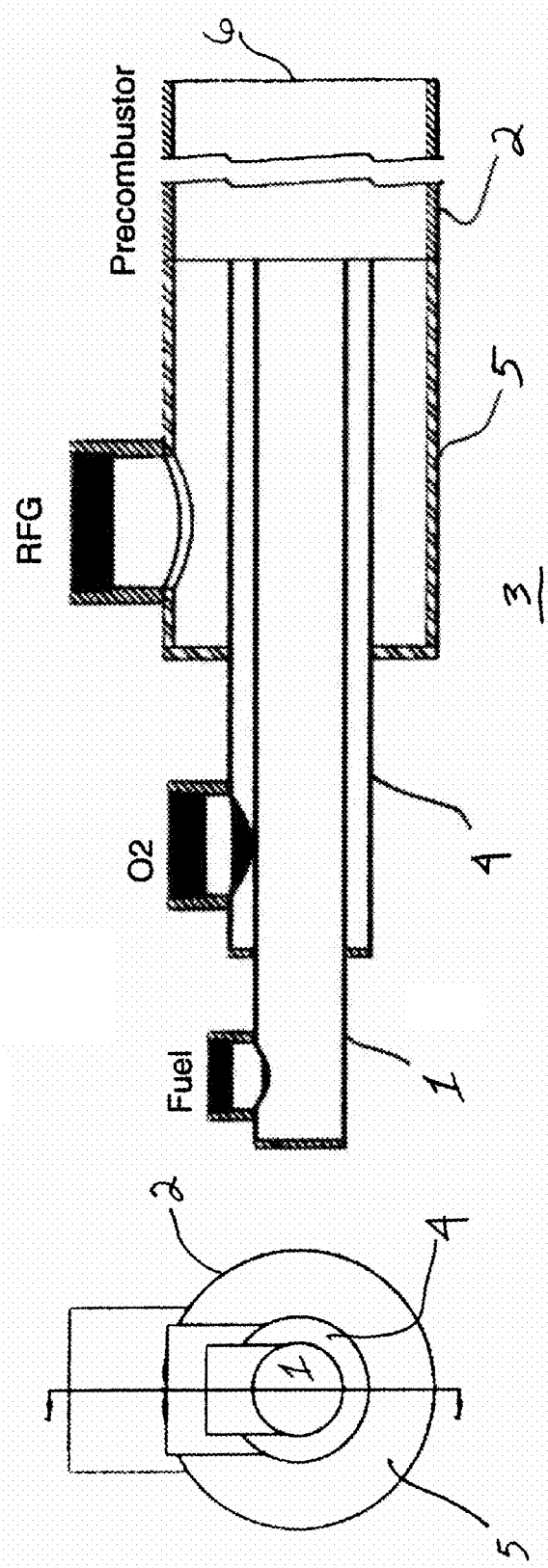
Figure 2:
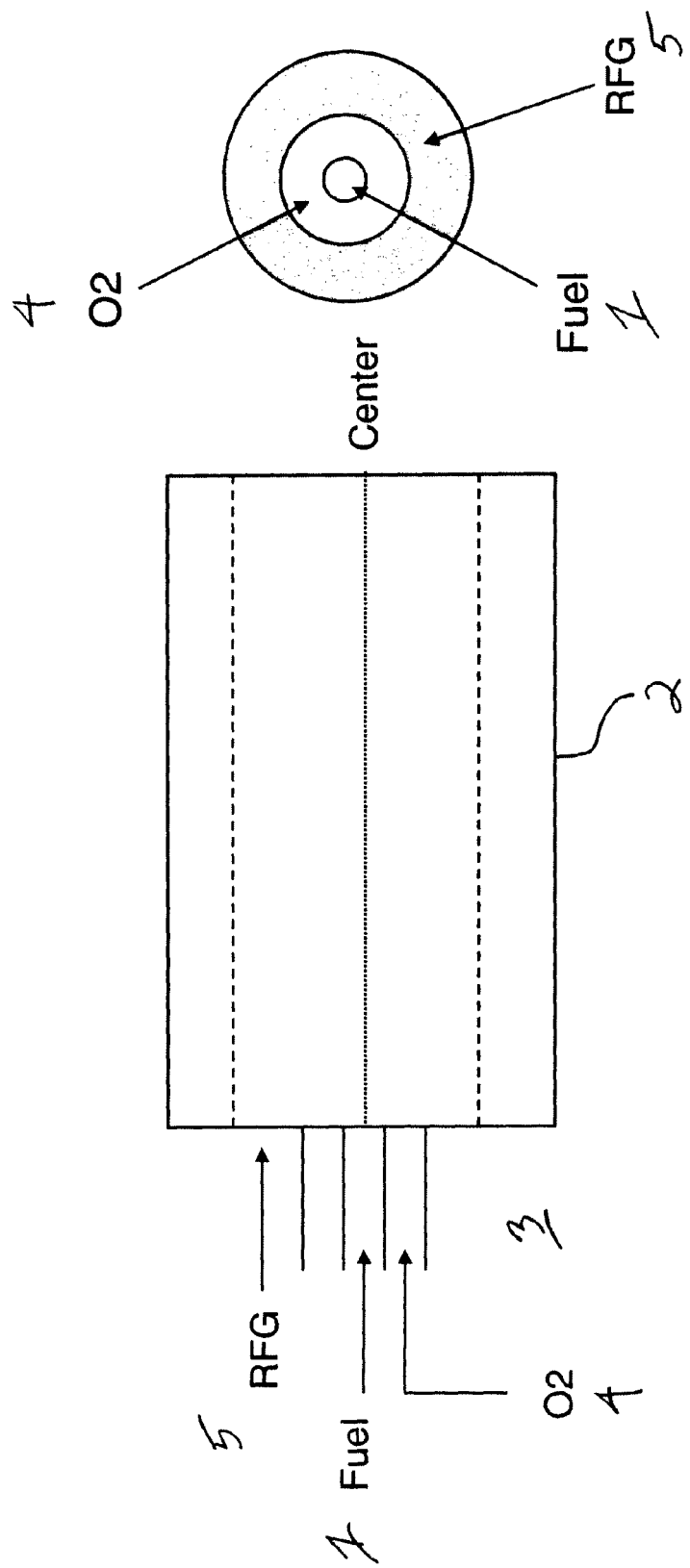

Referring now to the drawings, FIGS. 1 and 2 show an exemplary embodiment of the present disclosure. Fuel is introduced via conduit or pipe 1 into a precombustor 2 from a burner 3. Oxygen is introduced via conduit or pipe 4 and surrounds the fuel conduit 1, and recycled flue gas is introduced via conduit or pipe 5 and surrounds the oxygen conduit 4. Fuel, oxygen and recycled flue gas can be connected and supplied to their respective conduits in accordance with conventional apparatus and methods. When exposed to appropriate conditions, fuel and oxygen react along the length of the precombustor 2 such that a flame forms by the end face 6 of the precombustor thereby releasing heat into a furnace or other environment utilizing the heat (not shown).

The oxygen and fuel reaction can be initiated by heat absorbed via one or more of the following sources:

Radiation from the furnace

Energy from the precombustor walls in the form of either radiation (direct) or conduction/convection via the intermediate RFG stream.

Convection from pre-heating of reactants

A distinct energy source such as an ignitor or pilot flame

As the fuel and oxygen react, the reactants are combusted, and thereby consumed and converted into products, and the temperature of the reacting mixture increases. As the temperature increases, the reaction rates further increase, resulting in a temperature variation that occurs progressively more rapidly with distance along the precombustor. That is, the temperature versus distance curve is concave with respect to the distance axis. Since gas density is inversely proportional to temperature, density therefore decreases sharply with distance. In a precombustor having constant flow cross-sectional area, the result is a progressively increasing mixture velocity. Results of calculations showing the increase of mixture temperature and velocity with distance through the precombustor for an oxygen-natural gas flame are illustrated in FIG. 3. Referring now to FIGS. 3 and 4, increases in average mixture velocity by a factor of 3 is attainable in a precombustor with a nominal length to diameter ratio of 10. x/D as represented in FIGS. 3 and 4 is the distance from the exit of the fuel nozzle to the exit of the precombustor divided by the hydraulic internal diameter of the precombustor cross-section. In the case of a circular passage, the hydraulic diameter is equal to the actual diameter. For non-circular cross-sections, for example, the hydraulic diameter $D_h$, may be equal to four times the cross-sectional area divided by the perimeter. Consumption of oxygen within the precombustor for this same modeling case is illustrated in FIG. 4. Similar to the trends in temperature and acceleration, this Figure illustrates a variation of oxygen consumption with distance that is increasing along the precombustor length. The consumption of oxygen signifies that erosion of the gaseous barrier between the hot flame interface and relatively cool precombustor wall is taking place. Hence, to achieve a high degree of acceleration of the reacting mixture as depicted in FIG. 3, there is a risk that oxygen in the precombustor would be nearly or completely consumed. In one aspect of the invention, RFG is employed as a gaseous barrier or buffer between the precombustor wall (7 in FIG. 2) and the oxygen/fuel to control the temperature of the precombustor wall (e.g., the RFG can have a temperature from about 373 to about 1273K). If there is no RFG present to protect the precombustor wall from the hot flame, the wall can be exposed to the high temperature oxy/fuel flame and may eventually suffer a high temperature failure. However, the presence of RFG reduces, if not prevents, this from occurring and thereby permits a greater range of operation. The nature of the oxygen consumption versus distance curve (i.e., the greater than linear consumption of oxygen) also indicates that control of the reaction becomes challenging as the length of the precombustor and magnitude of acceleration increases. That is, a small perturbation in the reaction rate (e.g., perhaps caused by reactant flow non-uniformity or added turbulence), can lead to a progressively increasing rate of increase in oxygen consumption as the combustion reactions progress. In some cases, this will lead to the implementation of a narrower range of operating conditions in configurations where RFG is not employed.

The foregoing Figures illustrate that one desirable benefit of the presence of the RFG is to provide a supplemental barrier to prevent contact between the high temperature flame interface and the precombustor wall. Without wishing to be bound by any theory or explanation it is believed, that the protective action of the RFG stream depends primarily on the distance between the precombustor wall and outer edge of the oxygen stream (e.g. as this can define the initial barrier width of the RFG stream). Another parameter, however, is the relative flow rates and velocities among the RFG, fuel and oxygen streams. A high differential velocity between RFG and oxygen due for example, to the use of a large RFG passage with a low RFG flow rate, may result in rapid shear mixing of the RFG and oxygen streams with subsequent erosion of the protective barrier. A similar effect may result from too large of a RFG flow rate coupled with too small a RFG passage width. It is therefore useful to establish a range of RFG flow rates that are compatible with the dimensions of the precombustor. To minimize mixing between the reactive O2 stream and the protective RFG stream, it is useful for the ratio of the initial flow velocities (R1=VelocityO2/VelocityRFG) be within the range specified by equation 1 below. More generally R1 can range between about 0.3 and about 3.0.

$$0.5 < R1 < 2.0 \qquad [1]$$

Figure 5A:
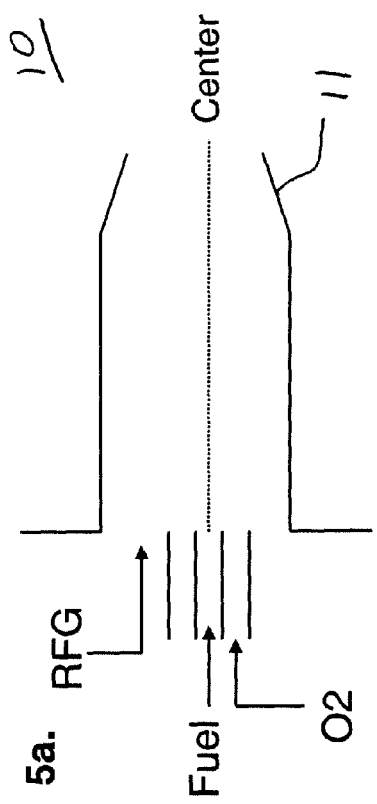
Figure 5B:
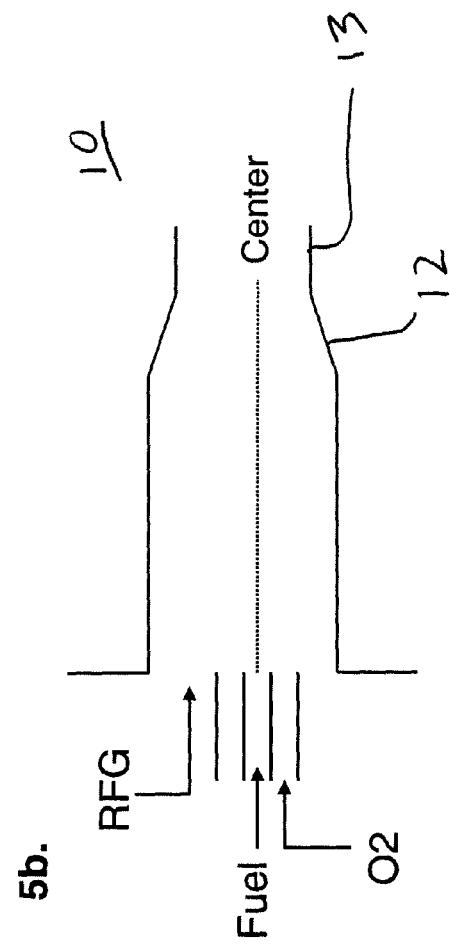

It is possible to increase the degree of acceleration of the flame beyond the level attainable with a constant flow cross-section by having the precombustor flow passage cross-section decrease with distance. While such a precombustor design was conventionally undesirable due to a change in flow stream direction and the subsequent compressing of hot gas against the precombustor wall, the use of RFG in accordance with the instant invention to control temperature makes this feasible, thereby broadening the range of flame momentum that can be achieved from a single burner. Referring to FIGS. 5a through 5c, two configurations of converging precombustor design are illustrated in FIGS. 5a and 5b. FIGS. 5a and 5b illustrate a precombustor 10 having oxygen, fuel and recycled flue gas supplied in the manner illustrated in FIGS. 1 and 2 wherein the cross-sectional dimensions of the precombustor are varied. FIG. 5a shows precombustor 10 having reduced cross-section 11 adjacent the end face of the precombustor. FIG. 5b shows precombustor 10 having a converging cross-section 12 that leads to a reduced and uniform cross-section 13. The precombustor 10 may also employ a straight precombustor section 14 followed by a divergent section 15 leading to a process furnace (not shown). In this case, as illustrated in FIG. 5c, acceleration occurs in the straight section as previously described, while the divergent section promotes recirculation of furnace gases (as distinguished from recycled flue gas) that increases turbulent mixing, assists in flame tempering (i.e. dilution) and potentially reduce $NO_x$ emissions.

Hence, the design of the precombustor with RFG is a desirable aspect of the invention and can be employed to control the operation of the burner as well as tailor the characteristics of the flame. A desirable design relationship between the initial flow velocities of the fuel and oxidant is shown by equation 2 below and more generally by equation 3 below where R2 is equal to VelocityO2/VelocityFuel.

$$0.5 < R2 < 2.0 \qquad [2]$$

$$0.3 < R2 < 3.0 \qquad [3]$$

While the use of RFG in precombustors allows for the attainment of higher degrees of precombustion of fuel and oxygen and, hence, higher levels of acceleration of the fuel/ oxygen stream into the process furnace simply by serving as a buffer between flame and wall, the momentum of the RFG stream itself may be used to tailor the flame characteristics. The RFG stream may add overall volume and momentum to the reacting mixture as it penetrates the furnace, thus offsetting the effects of buoyancy. In such a manner, the use of RFG is effective as a means for flame lengthening, and for stabilizing the flame within a turbulent furnace environment. However, those skilled in the art will recognize that additional effects may be achieved by specific manipulations of the RFG stream. For example, adding swirl to the RFG stream may cause the flame to both shorten and broaden as it enters the furnace space, while it also increases the shear between the $O_2$ and RFG thus reducing the width of the protective layer.

Another benefit of the use of RFG with a precombustor is as a means of ignition for the fuel and oxygen within the precombustor. For example, the temperature of the RFG stream can be increased to a level that provides all or part of the ignition energy to the fuel and oxidizer stream to facilitate rapid ignition of the mixture within the precombustor. This can be accomplished in several ways. For example:

Hot RFG introduced outside of oxygen and fuel as in FIG. 2.

Figure 6:
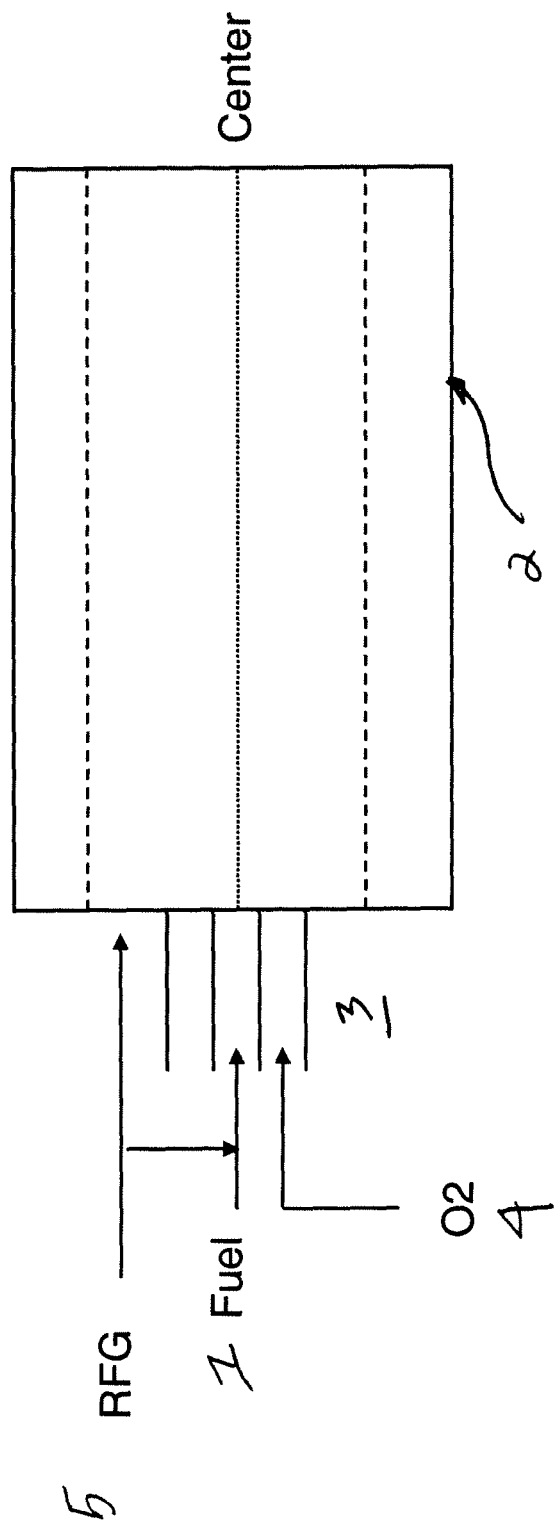
Figure 7:
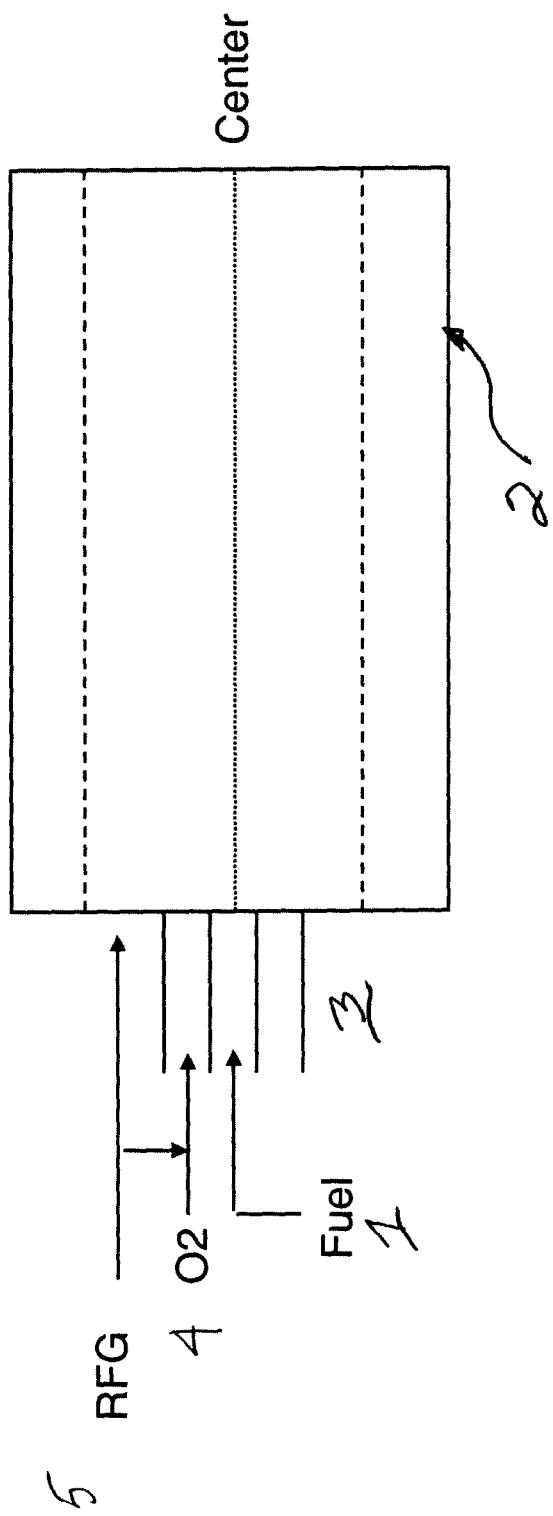

Hot RFG blended with oxygen or fuel as in FIGS. 6 and 7.

Figure 8:
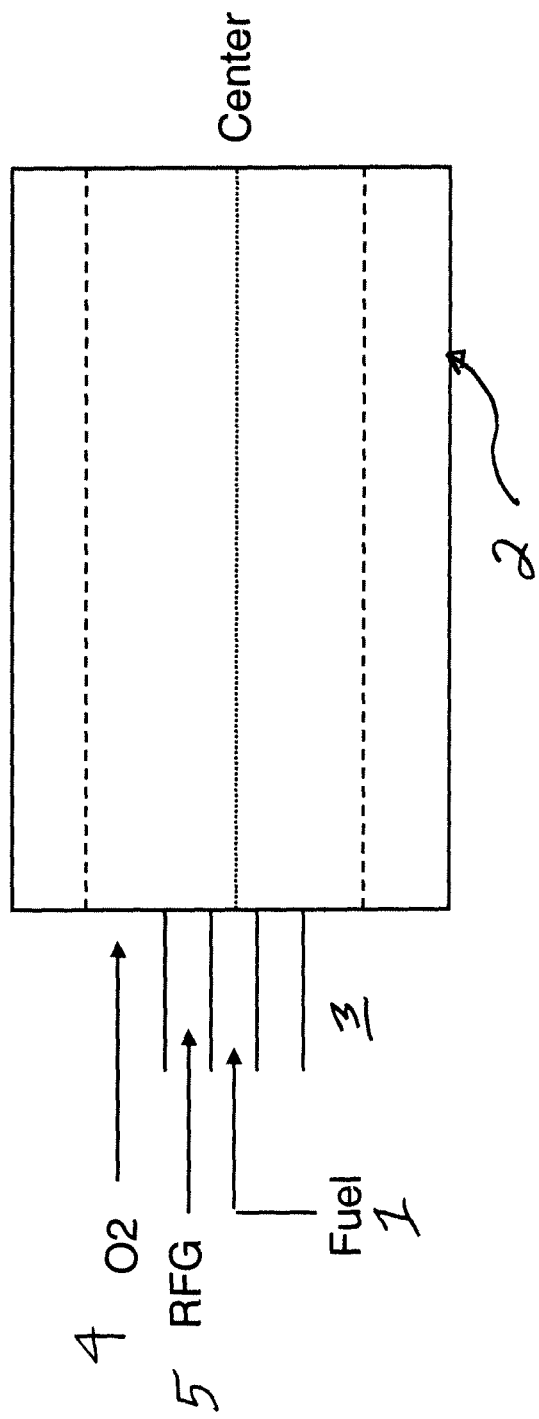

Hot RFG placed between oxygen and fuel as in FIG. 8.

Referring now to FIGS. 6, 7 and 8, FIGS. 6 and 7 illustrate an aspect of the combustion system illustrated in FIG. 2 with the exception that a portion of the RFG is introduced into at least one of the fuel and oxygen. The RFG can be combined with at least one of the fuel and oxygen by using conventional connections and methods. FIG. 8 illustrates an alternative delivery arrangement wherein RFG is introduced between the fuel and oxygen. In each of the aspects illustrated in FIGS. 6-8, a precombustor 2 is employed.

Utilization of hot RFG to provide ignition energy to the reactants within the precombustor has the advantage that it does not require a separate heat exchanger to be added to the process. That is, the RFG stream is already heated to a temperature that varies, for example, on the operation of the furnace system. In this aspect of the invention, the RFG will have a temperature ranging from about 373 to about 1273 K.

Figure 9:
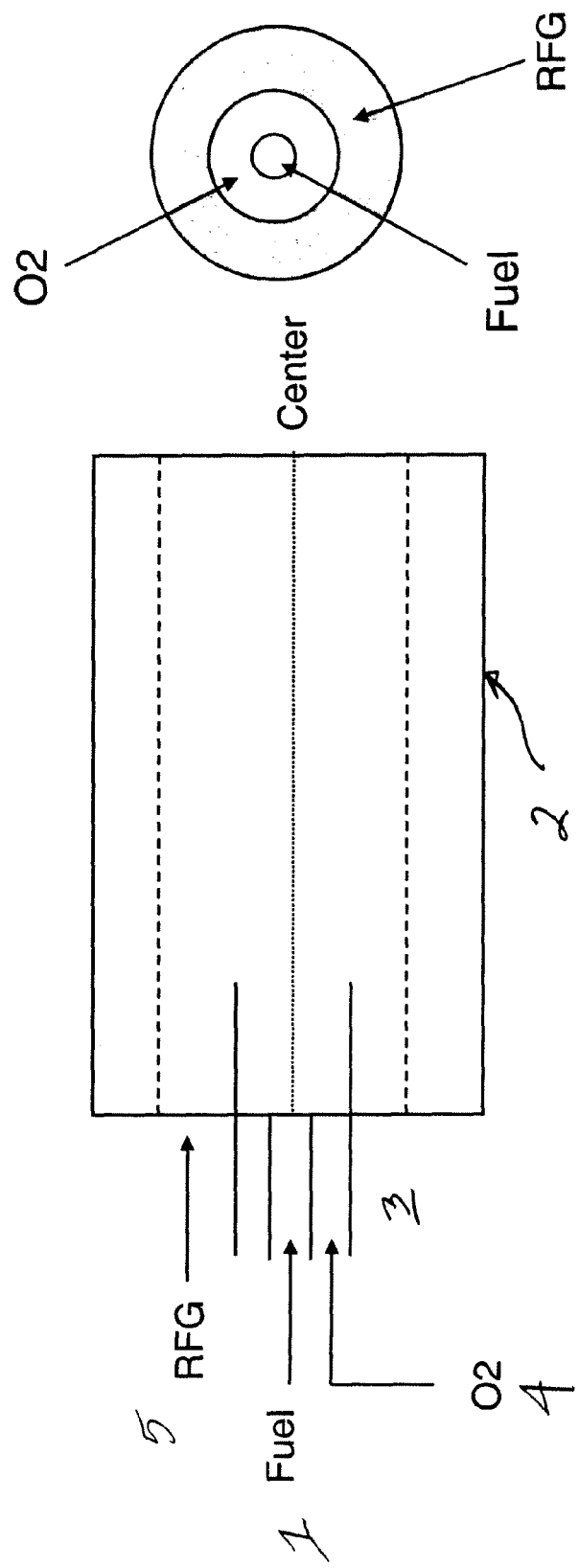

Another aspect of the invention relates to improving the flame stability while retaining the protective benefits of the RFG by delaying mixing between the RFG stream and oxidant and fuel streams as shown in FIG. 9. Referring now to FIG. 9, this may be accomplished by staging the inlet of the RFG stream 5 into the precombustor 2 using a barrier 8 so that a relatively pure stream of O2 4 may mix with the fuel 1 to initialize combustion. The RFG 5 is then added downstream of the fuel/oxygen mixture in order to protect the precombustor wall from flame impingement.

An oxy-fuel burner operating with RFG in accordance with the instant invention may be operated stably and with nearly constant momentum over a wide range of conditions. For example, in another aspect of the invention illustrated in FIG. 10, a precombustor 2 is coupled to a burner 3 that uses two RFG streams 21 and 22 that are supplied from RFG stream 20. One RFG stream 21 flows through the precombustor while the other RFG stream 22 flows outside the precombustor. A valve 23 in the RFG stream 20 allows for manipulation of the internal/external RFG split as a function of a process variable. Process variables that may be used to actuate the valve 23 and change the internal versus external RFG split include, but are not limited to, firing rate, sensors viewing the flame, sensors measuring the precombustor temperature, heat flux sensors in the furnace, emissions measurements or furnace gas/process fluid temperatures, or combinations thereof.

For example, when the burner firing rate is used as the actuating variable, a control scenario could proceed as follows: at a relatively low firing rate, the internal RFG flow is maximized, thereby augmenting the momentum and therefore maintaining the length of the burner flame, while at a relatively high firing rate, the external RFG flow is maximized so the internal momentum is curtailed while the flame length is kept nominally the same.

Figure 10:
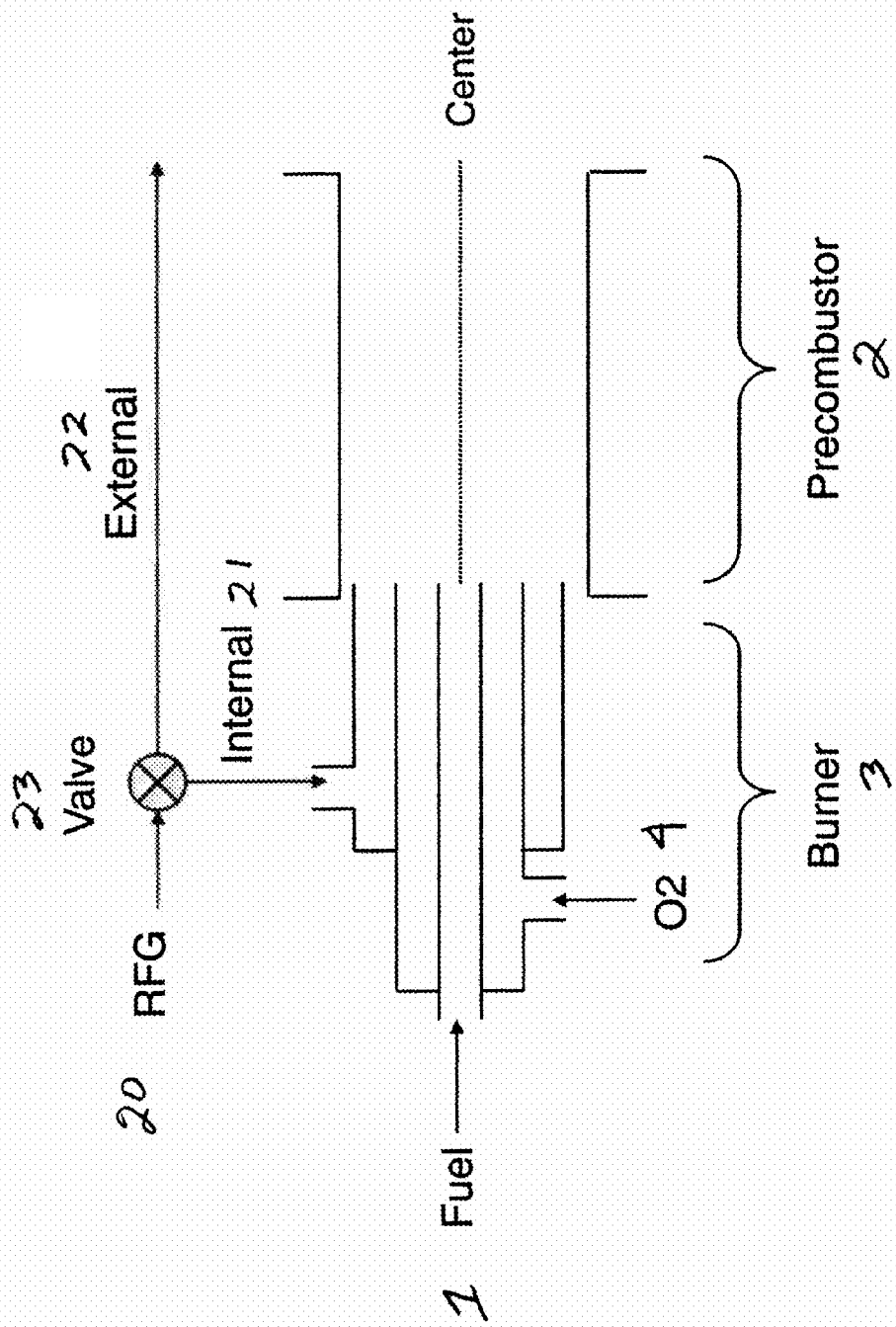
Figure 11:
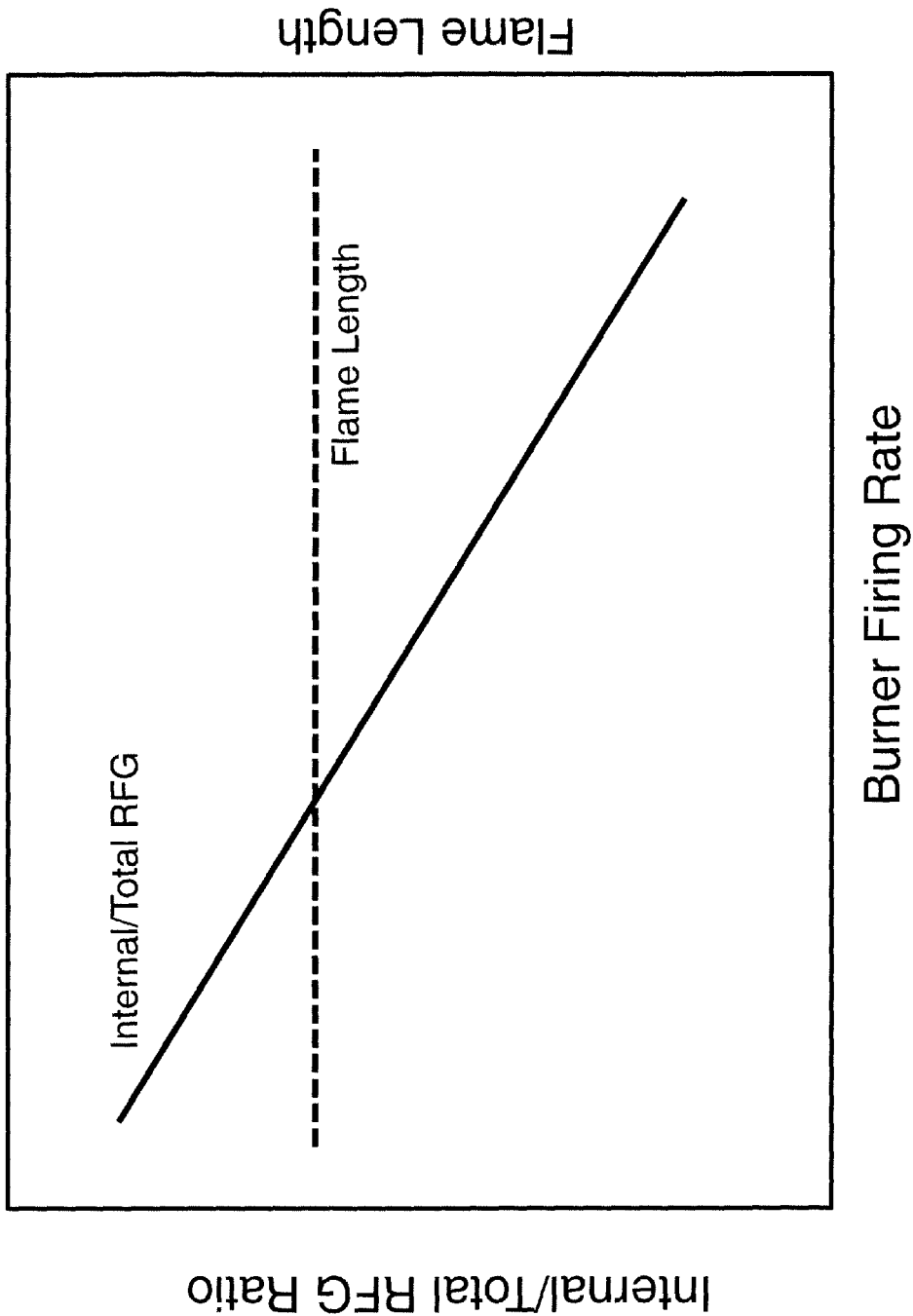

The aspect of the invention disclosed in the preceding paragraph relates to a method of operating the inventive combustion system to minimize the variation in length of the burner flame, and is qualitatively illustrated in FIG. 11. Referring now to FIG. 11, FIG. 11 illustrates the affects of varying the internal to total RFG flow rate ratio. For example, when a burner is operating at its lowest firing rate setting, it is typically desired to maintain the internal RFG flow rate relatively high. Similarly, for relatively high firing rate external RFG flow may high. In FIG. 11, a variation of internal to total RFG is shown (sloped line) that yields a substantially constant flame length (i.e. through burner momentum control). By controlling and appropriately varying the RFG as qualitatively depicted in this figure, the instant invention permits generating a flame having a substantially constant momentum even though the firing rate may increase or decrease. As a result, the aspect of the invention illustrated in FIGS. 10 and 11 can also extend the firing rate range of the burner.

Figure 12:
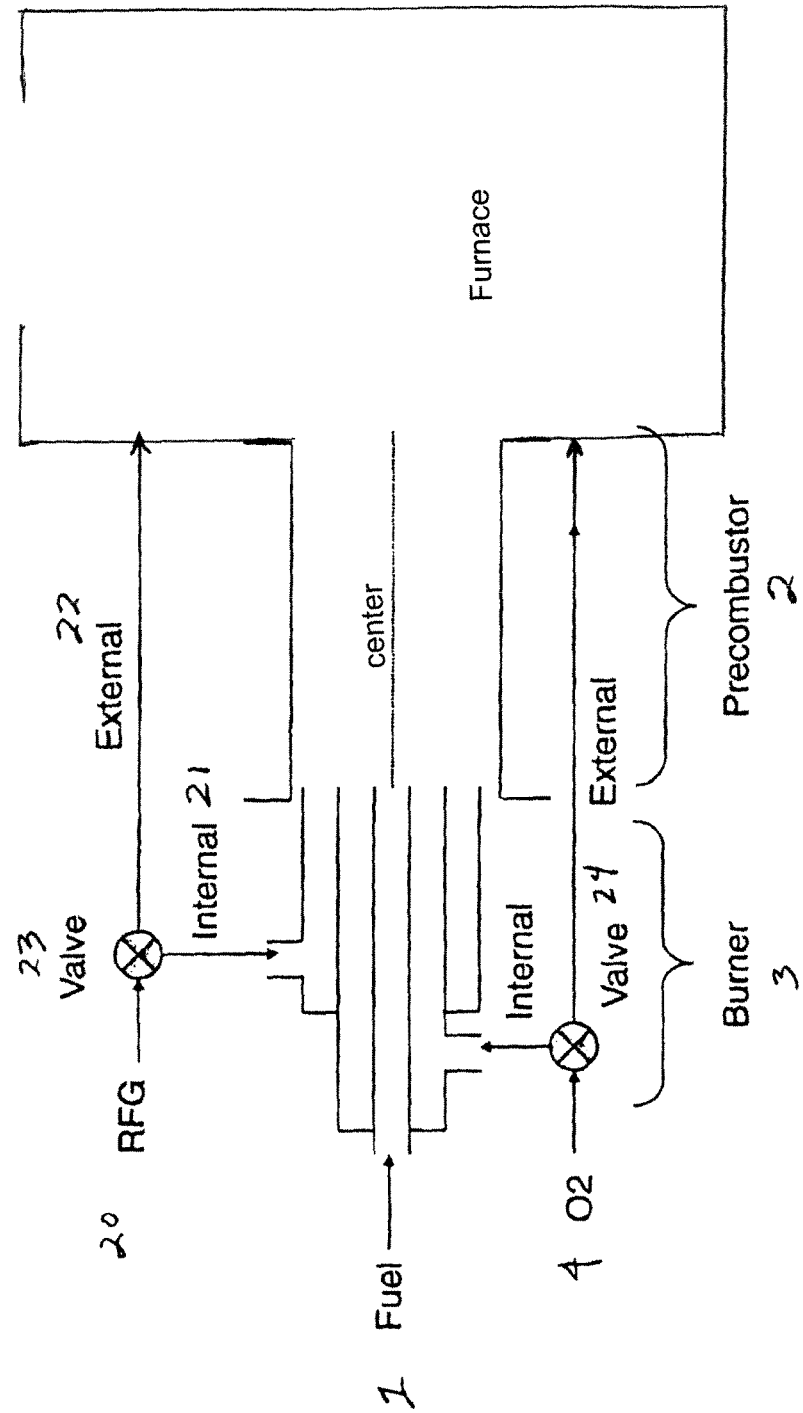

Another aspect of the invention is shown in FIG. 12, wherein controllable internal and external oxygen (relative to the precombustor) are added to the aspect of FIG. 10. The aspect shown in FIG. 12 provides the advantage of allowing for increased control over $NO_x$ emissions and flame properties such as temperature and heat flux. For example, by reducing the internal $O_2$ and increasing the external $O_2$ at a fixed firing rate, via valve 24, the maximum flame temperature and heat flux are reduced, the flame is generally lengthened, and reaction chemistry is altered in a manner that may lead to a reduction in (thermal and fuel) $NO_x$ generation. Alternatively, by increasing the internal $O_2$ and reducing the external $O_2$ via valve 24, a higher maximum flame temperature and a shorter, more compact flame with a higher maximum heat release rate may be achieved. The useful role that RFG plays in this aspect is to permit more aggressive or controlled "staging" (e.g., greater spread between internal and external $O_2$ flows) and hence, a wider range of control over maximum flame temperature, heat flux, flame length and $NO_x$ emissions, without sacrificing flame stability or precombustor mechanical integrity. Similar to the aspect of the invention illustrated by FIG. 10, the actuating variable or parameter for controlling the internal vs. external oxygen split can be of the group previously described, or from another group that is more important to operation of the process furnace in question.

Figure 13:
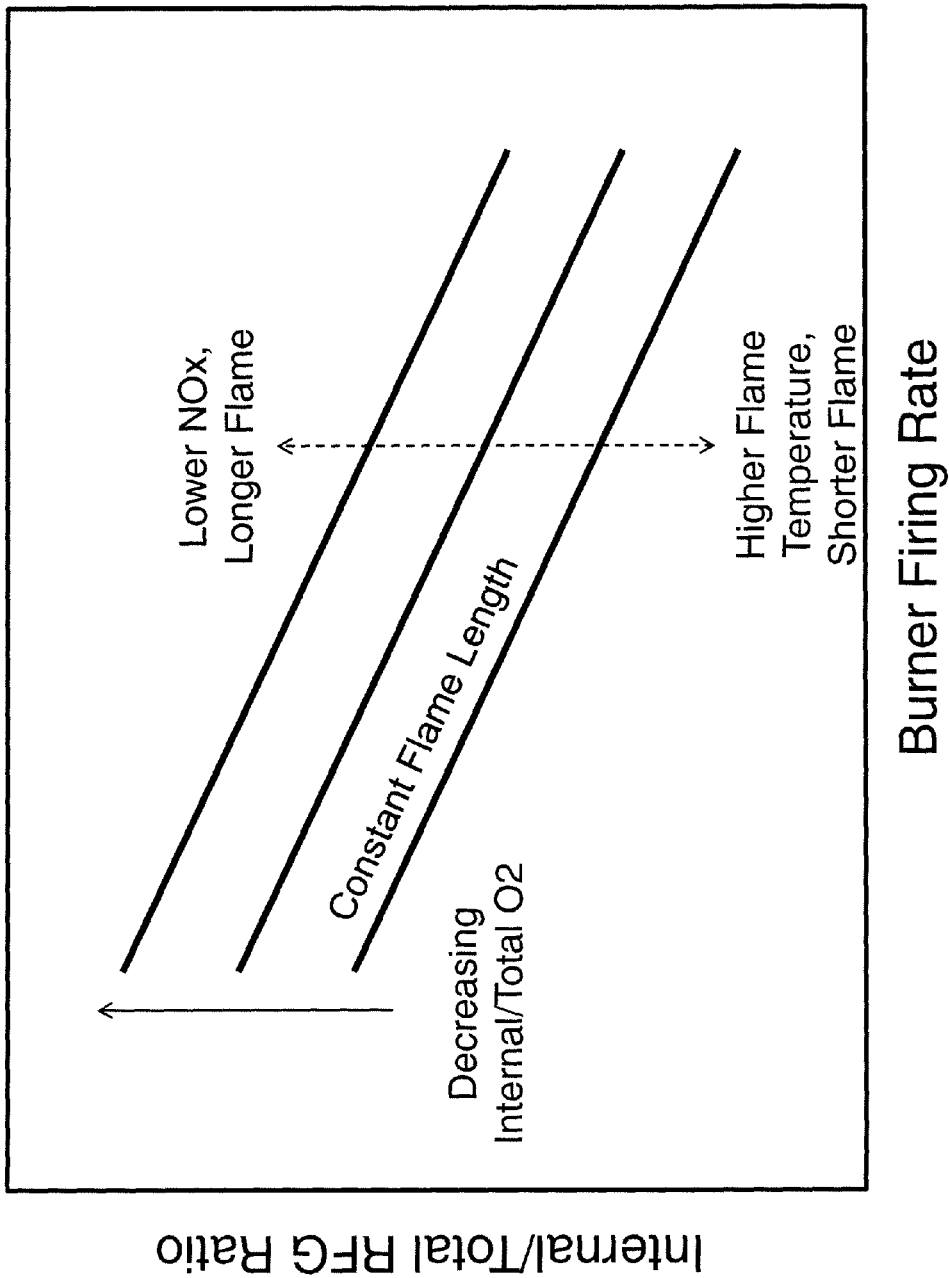

The additional degree of freedom in flame control afforded by simultaneous variability of both RFG and O2 within the precombustor is qualitatively illustrated in FIG. 13. For each value of the ratio of internal to total O2, a variation of the internal to total RFG with burner firing rate that yields a constant flame length is depicted. Note that as this ratio decreases, the combustion efficiency will eventually decrease, and may lead to a practical limit in the degree of oxygen staging that can be achieved. The actual limit will depend on fuel properties, furnace, and burner design.

Figure 14:
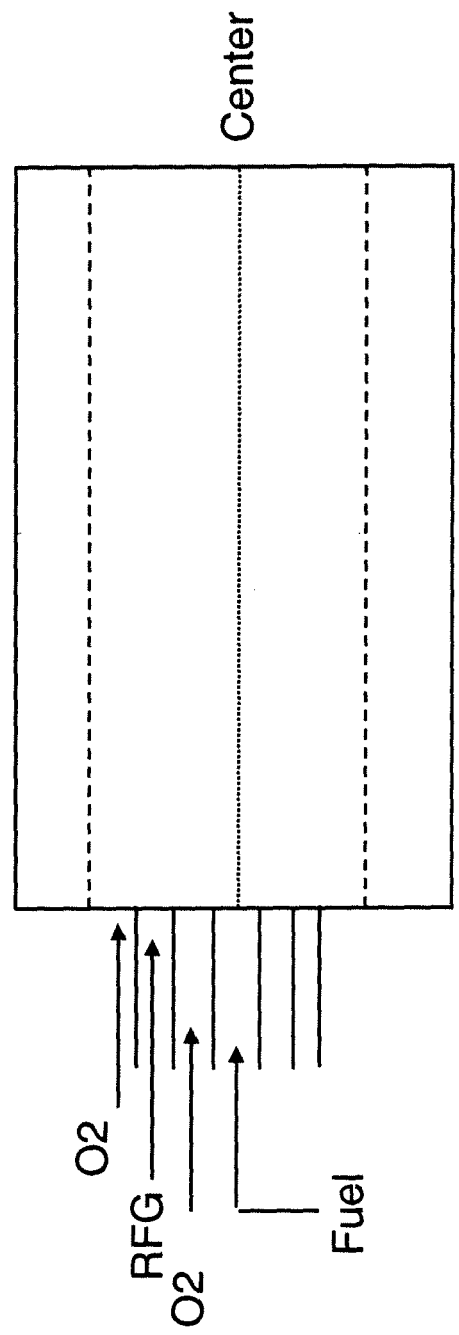
Figure 15:
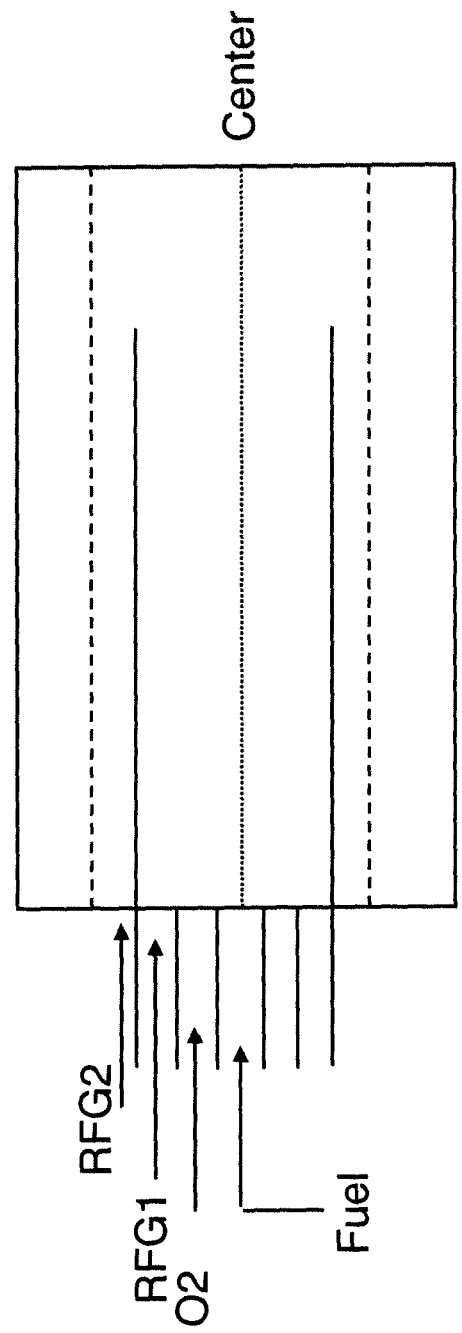
Figure 16:
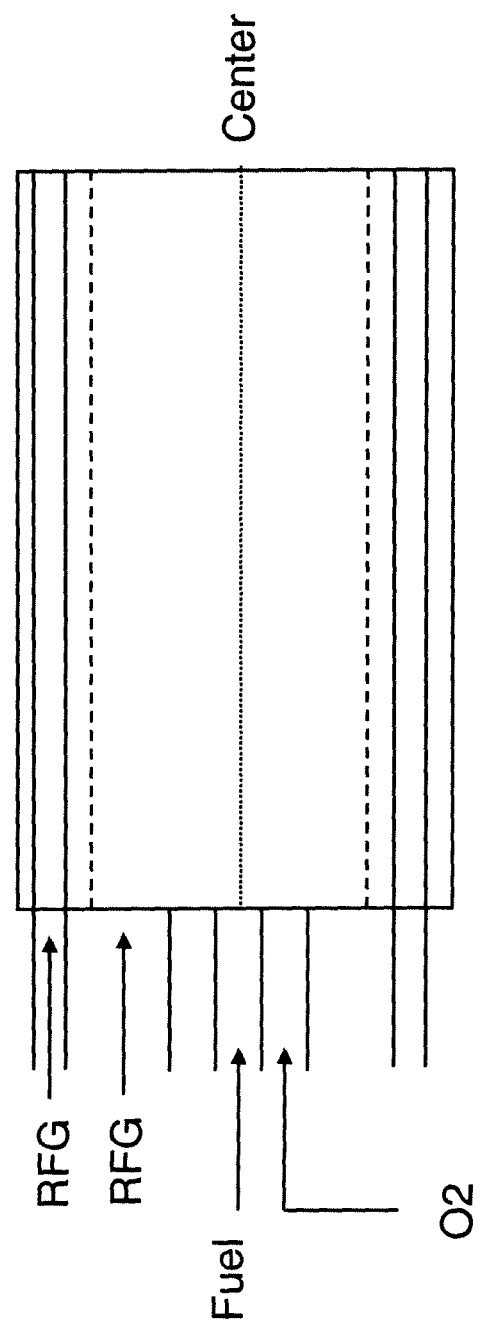
Figure 17:
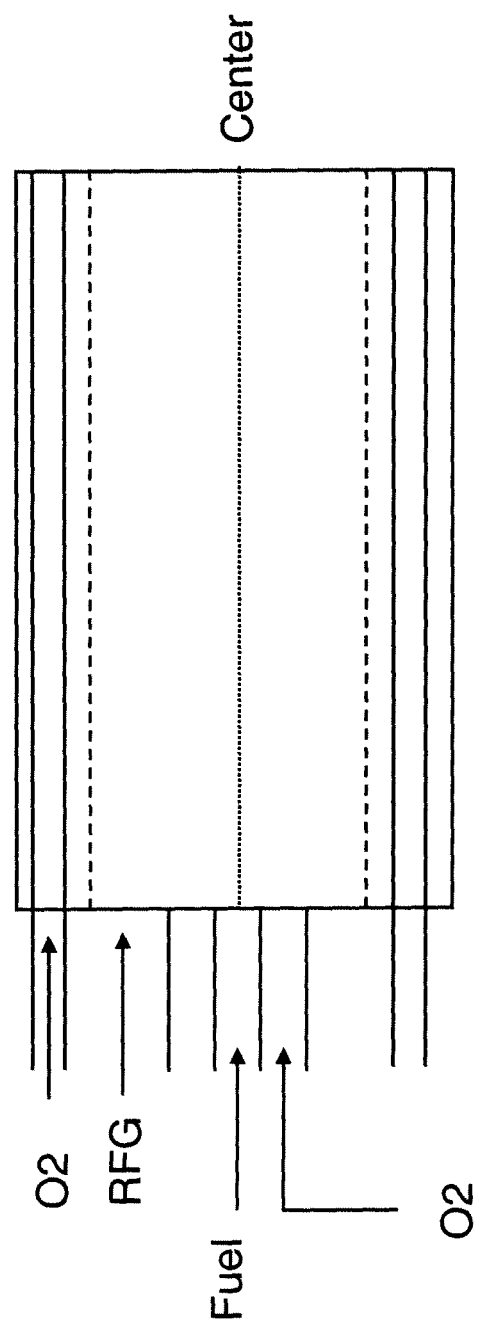

Referring now to FIGS. 14 through 19, these Figures illustrate additional aspects of the invention wherein one or more of the material flows can be controlled via staging. Referring now to FIGS. 14 and 15, these Figures illustrate an example of a means of achieving $O_2$ staging or RFG staging within the precombustor. Referring now to FIGS. 16 and 17, these Figures illustrate a means of achieving O2 staging or RFG staging within the burner/precombustor system but without injecting all of the O2 or RFG into the precombustor reaction space. If desired, the ratio between the two $O_2$ flows or between the two RFG flows can also be achieved by means of a control valve as shown in FIGS. 10 and 12.

Figure 18:
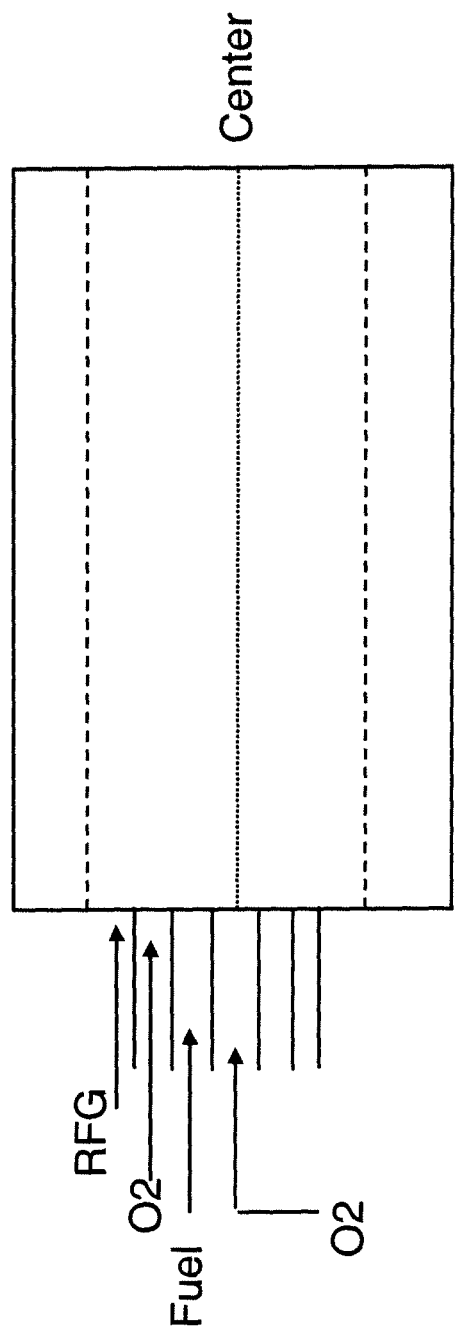
Figure 19:
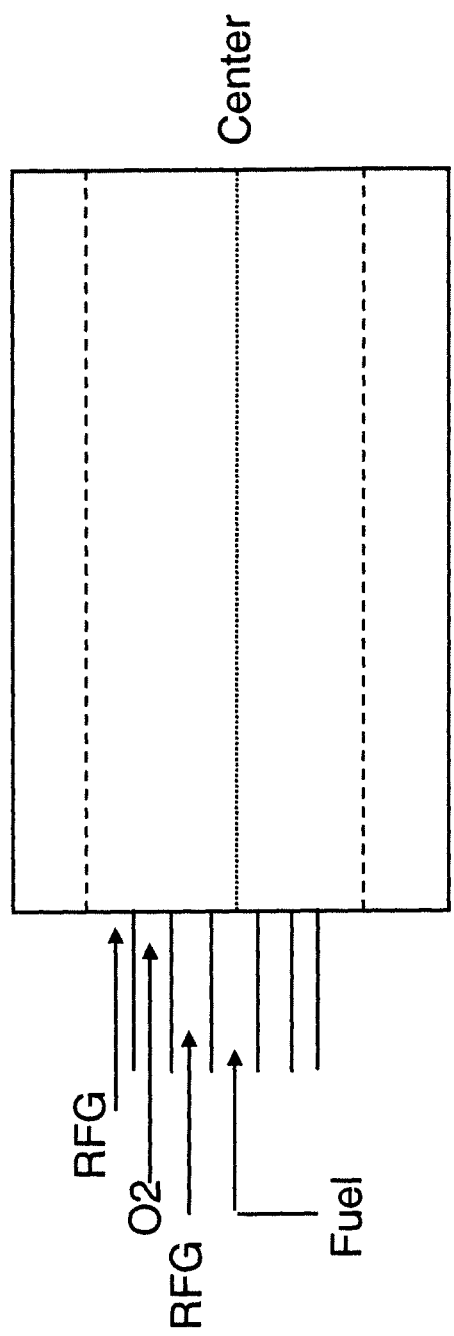

In one aspect of the invention, flame stability can be controlled or improved by employing multiple $O_2$ and or RFG inlet streams. For example, a central primary O2 and secondary $O_2$ stream may surround the fuel stream as shown in FIG. 18. This added contact area between the $O_2$ and fuel streams will increase the stability of the flame and may reduce fuel NOx (NOx generated from fuel nitrogen), which would therefore be especially important for solid or liquid fuels. Alternatively hot RFG may be used as mentioned previously to heat the fuel and/or $O_2$. However in order to promote mixing between the oxidant stream and the fuel stream, only a portion of the RFG may be used between the oxidant and fuel stream. The remainder of the RFG (which may be at a much lower temperature if desired) may be injected outside of the oxidant stream as a protectant to the precombustor as shown in FIG. 19.

Figure 20:
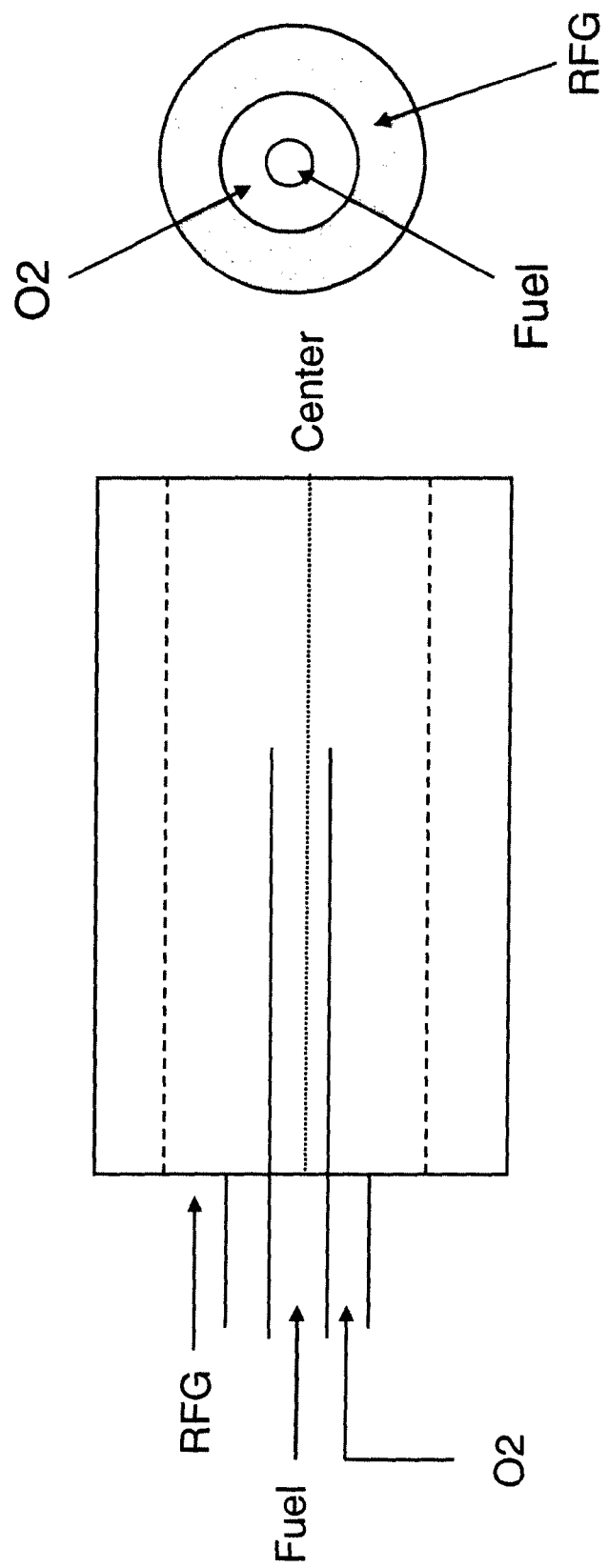

Referring now to FIG. 20, this Figure illustrates another aspect of the invention that minimizes any negative affect associated with fuel that may impinge on the walls of the precombustor due to fuel atomization (e.g. liquid fuels) or fuel transport (e.g. solid fuels). In this aspect the fuel nozzle may be moved or extended to be within the precombustor as shown in FIG. 20.

In addition to the various aspects described above, combinations of the above aspects may be combined to create aspects or embodiments without being outside of the scope of the present invention. For example, the precombustor and/or stream inlets can be non-circular in shape such as rectangles or polygons. This can be done in order to shape the flame to achieve more direction-specific radiation release.

The following Examples are provided to illustrate certain aspects of the invention and shall not limit the scope of the claims appended hereto.

EXAMPLES

A certain aspect of the instant invention analysis was carried out using the ANSYS/FLUENT version 6.3 computational fluid dynamics (CFD) software package. The results are illustrated in FIGS. 21 through 26. The burner modeled in this analysis is of the configuration disclosed in FIG. 2. That is, fuel (natural gas in this case) is introduced in a central conduit, oxygen in a first annular conduit and recycled flue gas (RFG) in a second (outer) annular conduit. The RFG is assumed to be pure CO2. The streams from the burner discharge into a 9 inch diameter by 20 inch long precombustor, which exhausts into a furnace. The flow cross-sectional areas of the various passages are presented in Table 1.

TABLE 1

| Conduit | Cross-Sectional Flow Area (in$^2$) |
| --- | --- |
| Fuel | 3.14 |
| Oxygen | 7.49 |
| Recycled Flue Gas | 53.0 |

The inlet temperatures of oxygen and natural gas are both 300 K. The recycled flue gas is assumed to be pure CO2, and is introduced at 500 K. The oxygen and RFG flows are introduced in a proportion such that, if they were combined, the resulting mixture would have an oxygen molar concentration of 28%. That is:

Moles Oxygen/[Moles Oxygen+Moles RFG]=0.28

Figure 21:
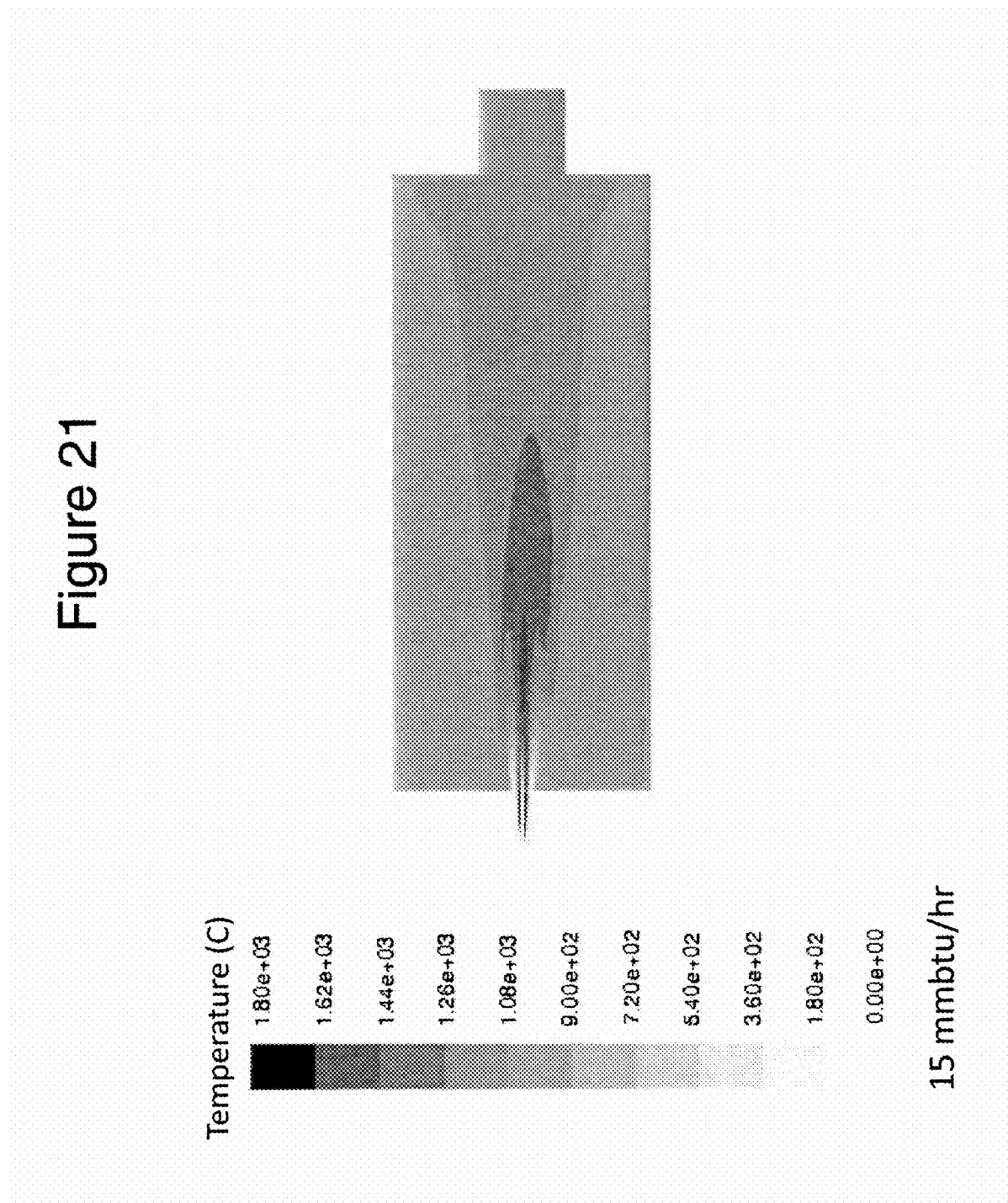
FIGS. 21 through 26 illustrate desirable temperature and velocity profiles that can be achieved by the instant invention.
Figure 22:
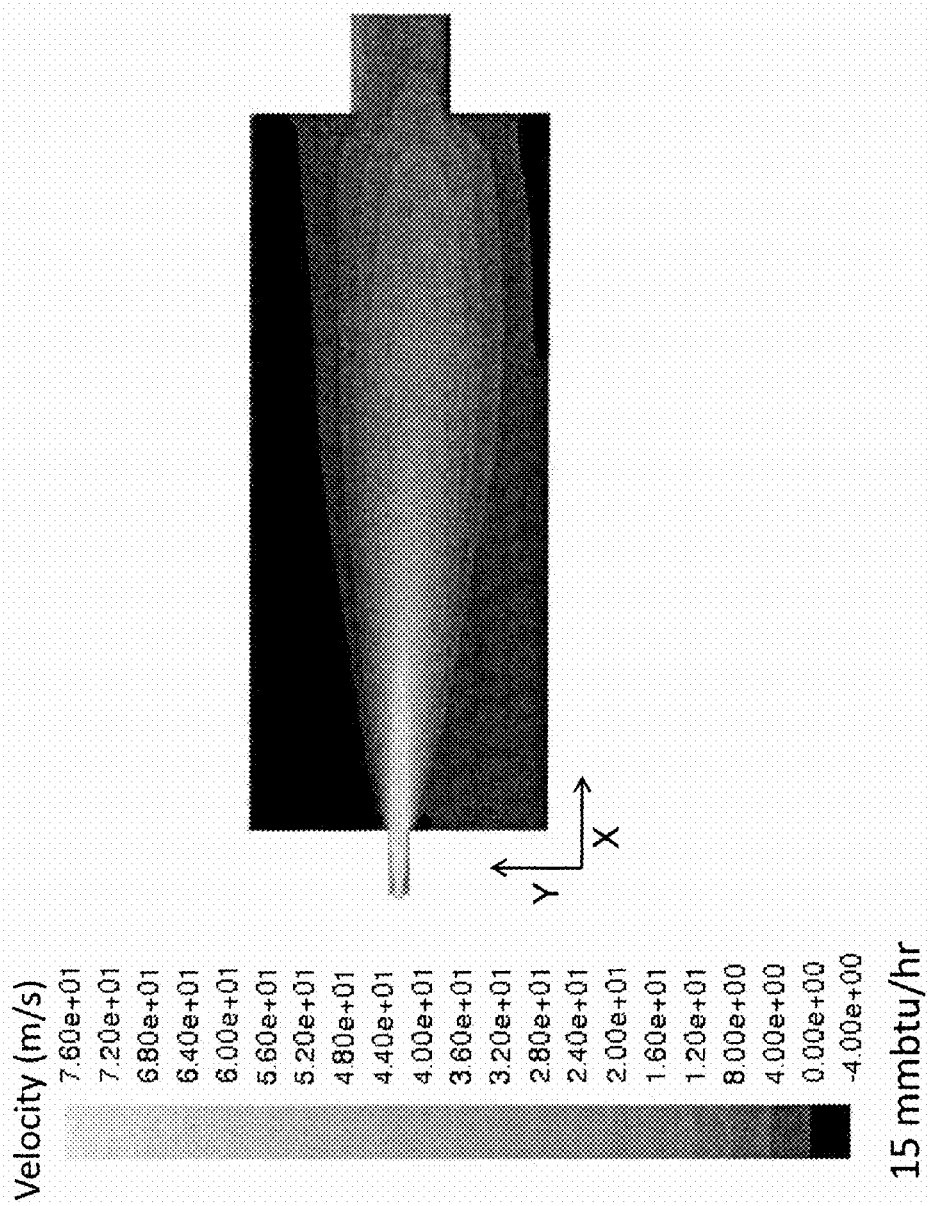
Figure 23:
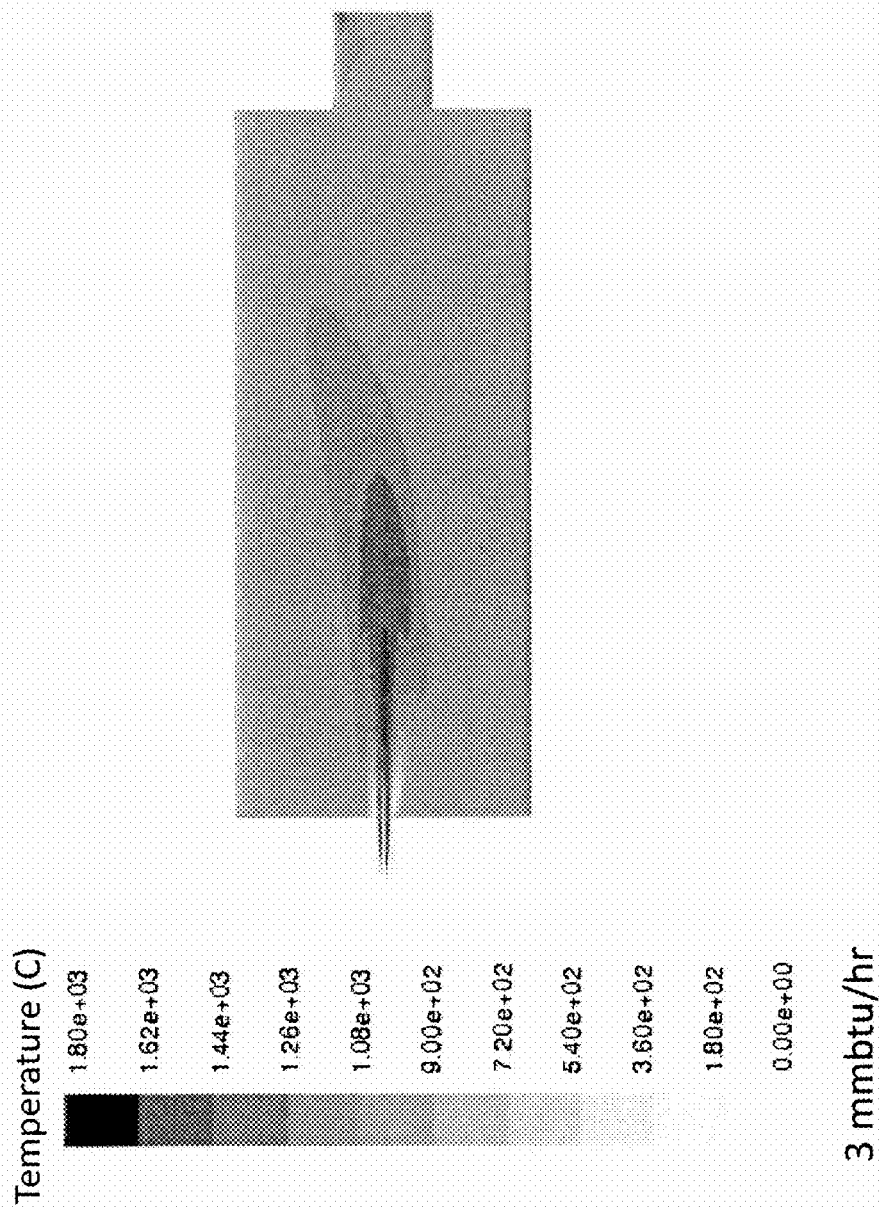
Figure 24:
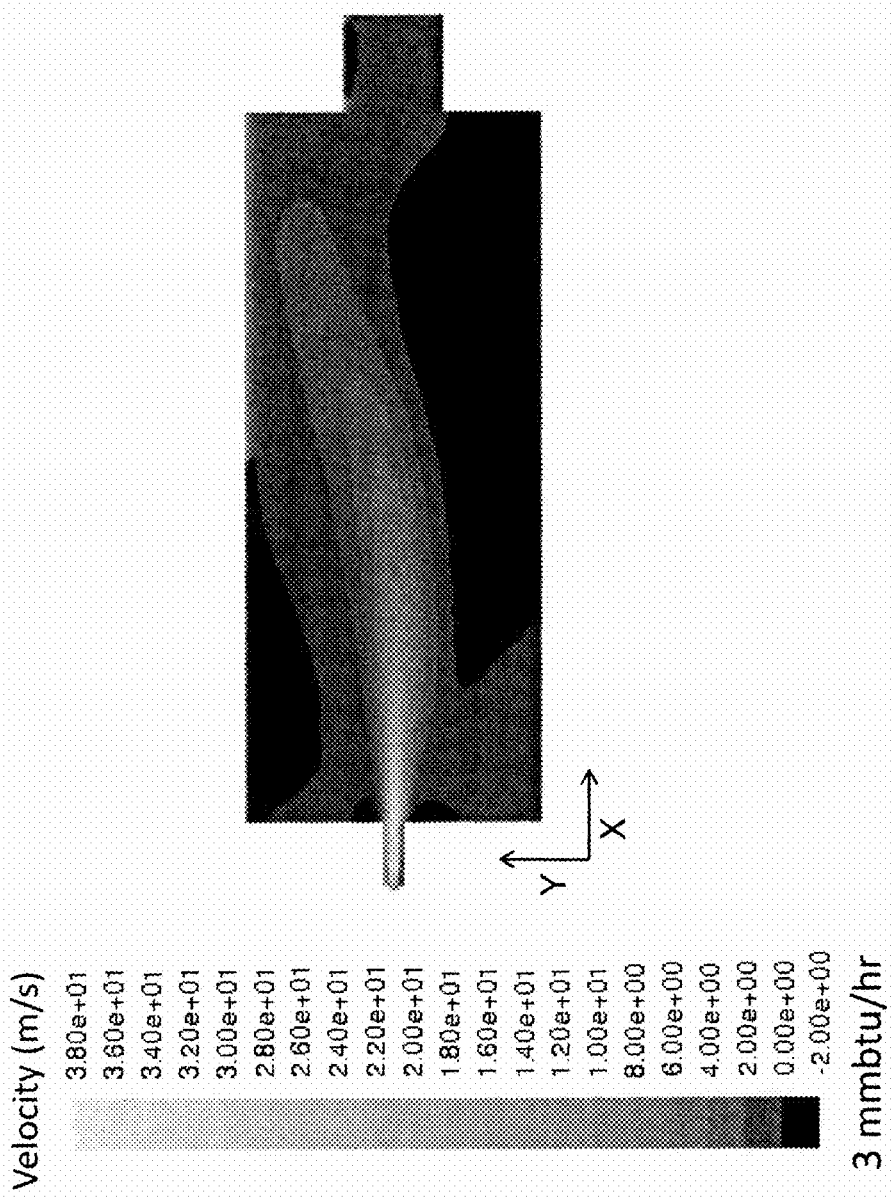

Referring now to FIGS. 21 and 22, these FIGS. 21 and 22 show the modeled temperatures and X direction velocity, respectively, for the inventive burner of Table 1 as operated at a thermal firing rate of 15 MMBtu/hr. Similarly, FIGS. 23 and 24 show the temperature and velocity patterns, respectively, that can be produced by the inventive burner operating at 3 MMBtu/hr. This analysis shows that, as the firing rate is lowered from 15 to 3 MMBtu/hr, the flame length, as estimated from the temperature contours, remains substantially the same. Further, as discerned from the shapes of both the temperature and velocity contours, the flame trajectory at the "turndown" or 3 MMBtu/hr condition is only minimally distorted (pulled upwards) by buoyancy forces.

Figure 25:
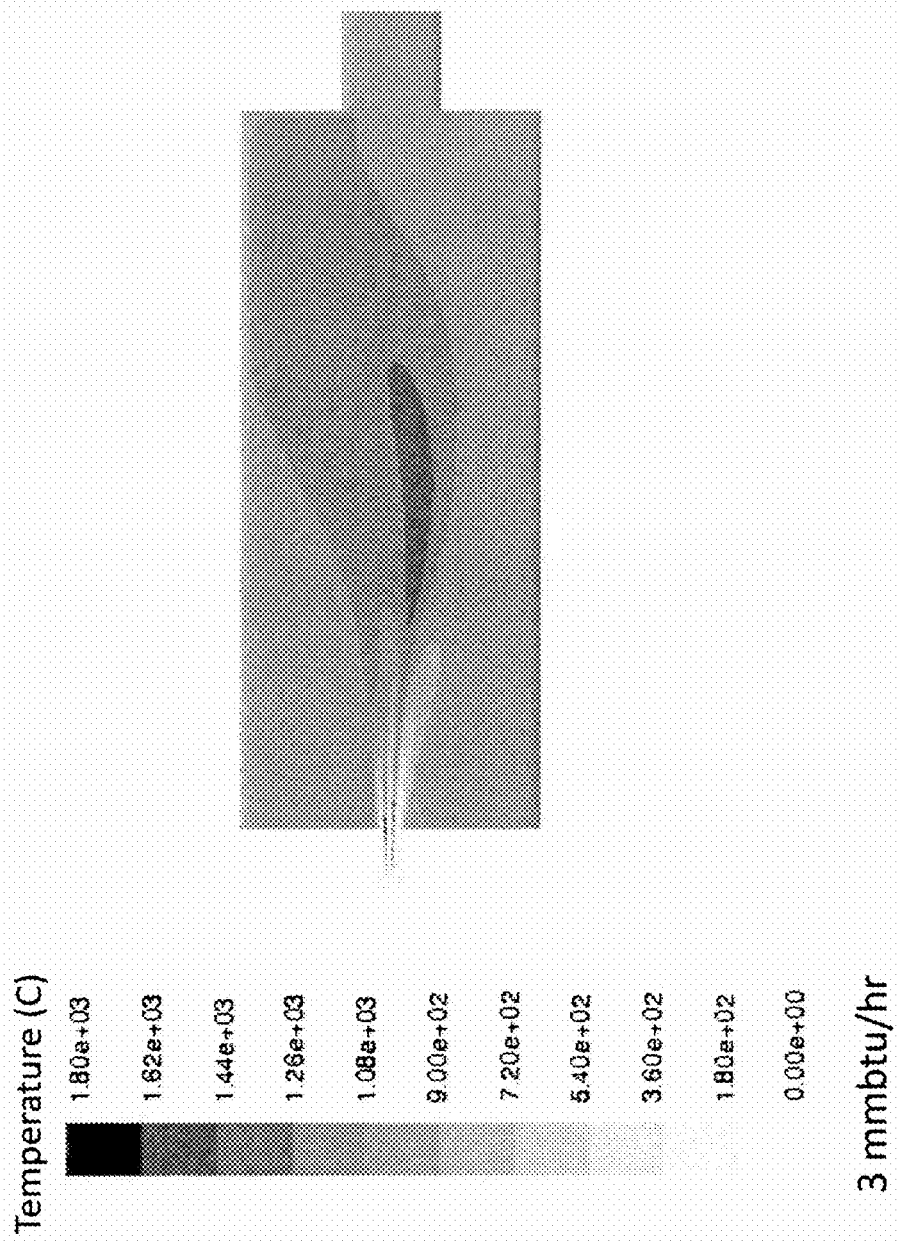
Figure 26:
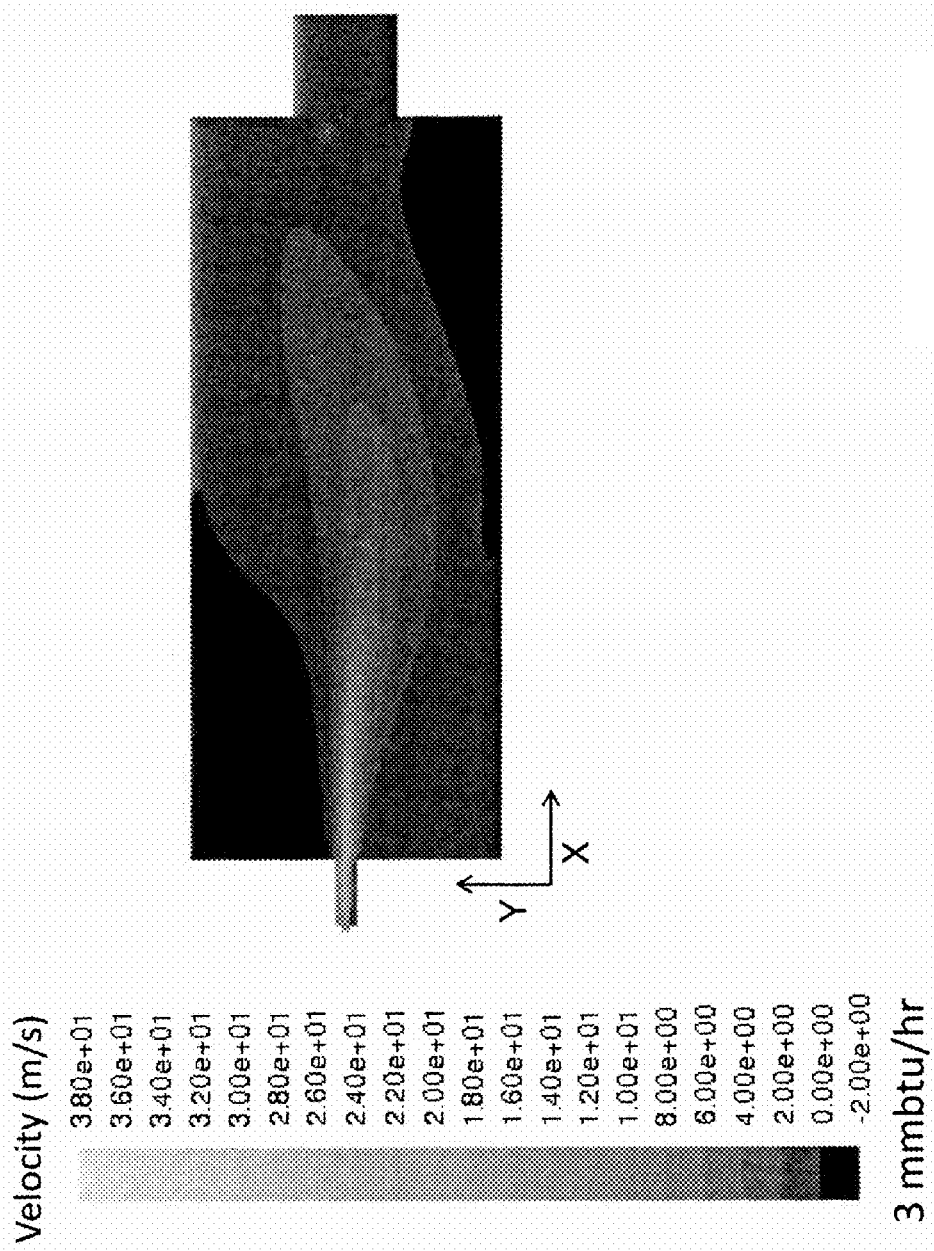

The characteristics of the system illustrated in FIGS. 23 and 24 were compared to those of the same burner operating with the oxygen and RFG premixed and distributed to both the oxygen and RFG conduits at 28 mol % O2. Temperature and velocity contours for the turndown case are shown in FIGS. 25 and 26, respectively. When comparing similar parameters, the buoyancy-induced distortion is more substantial for the pre-mixed O2/RFG. Without wishing to be bound by any theory or explanation, it is believe that this is due to the oxidant initially in contact with the fuel is of a much lower oxygen concentration for the premixed burner than for the inventive burner, and therefore slows the initial combustion reactions and reduces gas acceleration through the precombustor. Moreover, it is also believed that an added benefit of the inventive burner is that the outer RFG, being essentially inert, is able to provide more effective temperature protection of the precombustor wall. In the present comparison, the peak precombustor wall temperature is about 73 K lower with the inventive burner for the case shown in FIG. 23 than with the pre-mixed burner for the case shown in FIG. 25. This cooler precombustor wall temperature for the inventive burner occurs even though the peak flame temperature inside the precombustor for the inventive burner is 2184 K compared to 1260 K for the premixed burner. This relatively large difference of peak flame temperatures reflects a much more stable flame for the inventive system. A more stable combustion can be achieved at the same time as the precombustor wall temperature is reduced for the inventive system, thereby leading to a broader operating range while minimizing, if not eliminating, precombustor overheating.

Additional beneficial effects of the invention can be achieved by controlling the internal and external (relative to the burner) flows of oxygen and RFG that constitute additional aspects of the present invention. Inclusion of these benefits, for example as disclosed herein and depicted in FIGS. 10 and 12, would add additional ability to tailor the flame characteristics to achieve optimal results over a wider range of conditions than attainable without the application of the present invention.

While the invention has been described with reference to certain aspects or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

The invention claimed is:

1. An oxy/fuel combustion system comprising:
a burner having a longitudinal axis;
a furnace; and
a precombustor comprising a passage extending through the precombustor, said passage adapted to receive reaction products from the burner wherein the longitudinal axis of the burner is coincident with the passage, and wherein the burner comprises at least two annular fluid apertures surrounding a central aperture so that fluid exiting the at least two surrounding fluid apertures surrounds fluid exiting the central aperture and wherein one of the apertures contains oxygen, one contains fuel, and one contains RFG;
wherein the precombustor comprises a first end adjacent to an end of the burner emitting reaction products and a second end adjacent to the furnace;
wherein RFG is supplied to the combustion system via a first RFG stream that flows through the precombustor and a second RFG stream that flows outside the precombustor to the furnace;
wherein oxygen is supplied to the combustion system via a first oxygen stream that flows through the precombustor and a second oxygen stream that flows outside the precombustor to the furnace;
wherein the combustion system further comprises a flow control system wherein the flow rates of the first and second RFG streams are varied in response to a predetermined parameter; and
wherein the oxygen is an oxidizer having an oxygen concentration greater than about 30 mol %.

2. The combustion system of claim 1 wherein the central aperture comprises at least one fuel comprising a member selected from the group consisting of natural gas, hydrogen, refinery off gas, refinery fuel gas, blast furnace gas, propane, fuel oils, anthracite, bituminous, sub-bituminous, and lignite coals, tar, bitumen, petroleum coke, paper mill sludge solids and sewage sludge solids, wood, peat, and grass.

3. The combustion system of claim 1 wherein the RFG aperture surrounds the oxygen aperture.

4. The combustion system of claim 1 wherein the dimensions of the burner are sufficient to achieve a flow velocity ratio R1=Velocity oxygen/velocity RFG between about 0.3 and about 3.0.

5. The combustion system of claim 1 wherein the second end of the precombustor comprises a converging opening.

6. The combustion system of claim 1 wherein the second end of the precombustor comprises a diverging opening.

7. The combustion system of claim 1 further comprising a flow control system wherein recycled flue gas is combined with at least one of oxygen and fuel prior to entering the oxy/fuel burner.

8. The combustion system of claim 1 further comprising a flow control system wherein the flow rate of oxygen is varied in response to a predetermined parameter.

9. The combustion system of claim 1 wherein the first RFG stream is introduced adjacent to the burner and flows through a passage within the precombustor.

10. The combustion system of claim 1 wherein the first oxygen stream is introduced adjacent to the burner and flows through a passage within the precombustor.

11. The combustion system of claim 1 wherein at least three distinct fluid mixtures are conveyed through the passages.

12. The combustion system of claim 1 wherein the predetermined parameter comprises one or more of burner firing rate, furnace temperature, fuel quality, flue gas temperature, flame intensity, flame length, and flame stability.

13. The combustion system of claim 1 wherein the fluid exiting each aperture is of different composition.

14. A method for combusting a fuel comprising:
providing a combustion system comprising an oxy/fuel burner comprising a longitudinal axis, a furnace, and a precombustor comprising a passage extending through the precombustor, said passage adapted to receive streams from the oxy/fuel burner wherein the longitudinal axis is coincident with the passage, and wherein the burner comprises at least two concentric fluid apertures surrounding a central aperture for fuel so that fluid exiting the at least two surrounding fluid apertures surrounds fuel exiting the central aperture and wherein one of said at least two surrounding apertures contains oxygen and one contains RFG;
providing RFG to the combustion system via a first RFG stream that flows through the precombustor and a second RFG stream that flows outside the precombustor to the furnace;
providing oxygen to the combustion system via a first oxygen stream that flows through the precombustor and a second oxygen stream that flows outside the precombustor to the furnace;
passing the first oxygen stream, fuel, and the first RFG stream through their respective conduits in the oxy/fuel burner; and
passing the streams through the precombustor; wherein the flow rate of at least one of the first oxygen stream and the first RFG stream is varied in response to an external measurement;
wherein the oxygen is an oxidizer having an oxygen concentration greater than about 30 mol %.

15. The method of claim 14 wherein the external measurement comprises at least one member selected from the group consisting of firing rate, sensors viewing the flame, sensors measuring the precombustor temperature, heat flux sensors in the furnace, emissions measurements and furnace gas/process fluid temperatures.

16. The method of claim 14 wherein a flame is formed and the flow rate of the first RFG stream is varied in a manner sufficient to maintain a substantially constant flame length.

17. The method of claim 14 wherein the first oxygen stream and first RFG stream flow rates are varied in a manner sufficient to maintain a predetermined level of NOx emissions.

18. The method of claim 14 where said passing the first oxygen stream, fuel, and the first RFG stream through their respective conduits in the oxy/fuel burner comprises passing at least three distinct fluid mixtures through the oxy/fuel burner.

* * * * *